(12) United States Patent
Yasumi

(10) Patent No.: US 8,446,375 B2
(45) Date of Patent: May 21, 2013

(54) COMMUNICATION APPARATUS, INPUT CONTROL METHOD AND INPUT CONTROL PROGRAM

(75) Inventor: Manabu Yasumi, Tokyo (JP)

(73) Assignee: Sony Corporation, Tokyo (JP)

( * ) Notice: Subject to any disclaimer, the term of this patent is extended or adjusted under 35 U.S.C. 154(b) by 1204 days.

(21) Appl. No.: 12/326,442

(22) Filed: Dec. 2, 2008

(65) Prior Publication Data

US 2009/0160802 A1 Jun. 25, 2009

(30) Foreign Application Priority Data

Dec. 21, 2007 (JP) ................................. 2007-331100

(51) Int. Cl.
*G06F 3/041* (2006.01)
*G09G 5/00* (2006.01)

(52) U.S. Cl.
USPC .......................................... 345/173; 345/156

(58) Field of Classification Search
USPC ............ 345/156–184, 104; 178/18.01–20.04; 715/863
See application file for complete search history.

(56) References Cited

U.S. PATENT DOCUMENTS

| | | | | | |
|---|---|---|---|---|---|
| 6,049,329 | A | * | 4/2000 | Zetts et al. ...................... | 345/179 |
| 7,231,208 | B2 | * | 6/2007 | Robertson et al. ............. | 455/416 |
| 8,230,246 | B1 | * | 7/2012 | Sharkey ......................... | 713/320 |
| 2002/0027546 | A1 | * | 3/2002 | Shimoosawa et al. ........ | 345/156 |
| 2005/0012723 | A1 | * | 1/2005 | Pallakoff ....................... | 345/173 |
| 2006/0197750 | A1 | * | 9/2006 | Kerr et al. ...................... | 345/173 |
| 2006/0197753 | A1 | * | 9/2006 | Hotelling ....................... | 345/173 |
| 2007/0132724 | A1 | * | 6/2007 | Muranaka ...................... | 345/156 |
| 2007/0192699 | A1 | * | 8/2007 | Lee et al. ........................ | 715/727 |
| 2007/0273665 | A1 | * | 11/2007 | Park et al. ...................... | 345/173 |
| 2007/0277124 | A1 | * | 11/2007 | Shin et al. ...................... | 715/863 |
| 2008/0042978 | A1 | * | 2/2008 | Perez-Noguera ............. | 345/168 |
| 2008/0164994 | A1 | * | 7/2008 | Johnson et al. ............... | 340/533 |
| 2011/0201301 | A1 | * | 8/2011 | Okada et al. ............... | 455/404.1 |
| 2012/0314880 | A1 | * | 12/2012 | Mishra .......................... | 381/71.1 |

FOREIGN PATENT DOCUMENTS

| | | |
|---|---|---|
| JP | 4-163612 | 6/1992 |
| JP | 2003-122494 | 4/2003 |
| JP | 2003-202957 | 7/2003 |
| JP | 2003-204383 | 7/2003 |
| JP | 2003-298722 | 10/2003 |

* cited by examiner

*Primary Examiner* — Alexander Eisen
*Assistant Examiner* — Patrick F Marinelli
(74) *Attorney, Agent, or Firm* — Oblon, Spivak, McClelland, Maier & Neustadt, L.L.P.

(57) ABSTRACT

A communication apparatus includes a touch panel for inputting a command by touching a surface thereof having an oblong profile short in one direction relative to the other direction orthogonal thereto, the touch panel outputting a touch position detection data in response to a touch given to a spot on the surface thereof for locating the touch position but not outputting touch position detection data when some other spot is touched while the spot is being touched, a speaker arranged outside and near one of the edges of the touch panel running in the one direction and a microphone arranged outside and near the other edge of the touch panel running in the one direction. The touch panel provides a command input region inputting a command in at least a part of the surface thereof arranged along the other direction and close to the other edge in a talk mode.

4 Claims, 15 Drawing Sheets

COMMUNICATION APPARATUS, INPUT CONTROL METHOD AND INPUT CONTROL PROGRAM

CROSS REFERENCES TO RELATED APPLICATIONS

The present invention contains subject matter related to Japanese Patent Application JP2007-331100 filed in the Japanese Patent Office on Dec. 21, 2007, the entire contents of which being incorporated herein by reference.

BACKGROUND OF THE INVENTION

1. Field of the Invention

The present invention relates to a communication apparatus, an input control method and an input control program that can suitably be applied to portable information communication terminals having communication features for voice communications.

2. Description of the Related Art

Existing portable wireless communication terminals are provided at a surface of the terminal main body with a display and a touch panel is arranged on the surface of the display.

Such portable wireless communication terminals are also provided with a cover panel that can be opened to expose the display at a surface of the terminal main body to the outside and closed to cover the display.

As the cover panel is opened relative to the terminal main body of the portable wireless communication terminal, the terminal goes into a data communication mode for realizing the data communication features including electronic mail features and facsimile features of the terminal and displays display elements that represent various commands for realizing the data communication features.

Then, the portable wireless communication terminal prompts the user to touch an area of the touch panel that corresponds to one of the display elements on the display that the user selects to input the command represented by an icon and operates for data communication according to the input command.

The portable wireless communication terminal is also provided at the front side of the cover panel with a microphone, a speaker and a plurality of keys to be used to input various commands necessary for realizing voice communications.

As the cover panel is closed relative to the terminal main body of the portable wireless communication terminal, the terminal goes into a voice communication mode for realizing voice communication features and prompts the user to input a command by means of any of the keys at the front side of not the touch panel but the cover panel.

Thus, the portable wireless communication terminal prompts the user to input a command by depressing any of the various keys on the front side of the cover panel and operates for voice communication according to the input command (refer to, e.g., Jpn. Pat. Appln. Laid-Open Publication No. 11-046383).

SUMMARY OF THE INVENTION

Thus, an input section of the portable wireless communication terminal having the above-described configuration for realizing the data communication features and voice communication features includes the touch panel on the display and the plurality of keys at the front side of the cover panel that are arranged in a distributed manner.

As the cover panel of the portable wireless communication terminal is opened or closed relative to the terminal main body, the operation mode of the terminal is switched so that the user can input a command through the touch panel or the keys, whichever appropriate.

When the user wants to utilize the voice communication features of the portable wireless communication terminal while the cover panel is opened relative to the terminal main body, he or she has to close the cover panel. The user may feel it cumbersome to take such an action.

For this reason, portable wireless communication terminals that are not provided with a cover panel but display a plurality of display elements representing various commands necessary for voice communication on the display to prompt the user to touch an appropriate area of the touch panel have been proposed.

However, such portable wireless communication terminals that are not provided with a cover panel are accompanied by a problem that the touch panel can be touched by a palm or a cheek of the user's face to unintentionally input a command when the user holds the terminal main body, covering the surface of the display with the palm, in a voice communication mode or in response to an incoming call or when the user's face is brought close to the surface of the display to talk through the terminal, whichever appropriate.

In short, portable wireless communication terminals not provided with a cover panel are accompanied by a problem that the touch panel is touched by a palm or a cheek of the user's face to give rise to an operation error, which can hardly be avoided.

In view of the above-identified circumstances, the present invention is aimed to provide a communication apparatus, an input control method and an input control program that can avoid any operation error in a voice communication mode.

In an aspect of the present invention, there is provided a communication apparatus for communicating with another apparatus, including: a touch panel to be used to input a command by touching a surface thereof having an oblong profile that is short in one direction relative to the other direction orthogonal thereto, the touch panel being adapted to output touch position detection data in response to a touch given to a spot on the surface thereof for locating the touch position but not to output any touch position detection data when some other spot on the surface is touched while the spot is being touched; a speaker arranged outside and near one of the edges of the touch panel running in the one direction; and a microphone arranged outside and near the other edge of the touch panel running in the one direction, and the touch panel providing a command input region for inputting a command in at least a part of the surface thereof arranged along the other direction and close to the other edge in a talk mode.

Thus, according to an aspect of the present invention, when the user holds the communication apparatus, covering the surface of the touch panel with a palm, or in response to an incoming call or when the user's face is brought close to the surface of the touch panel to talk to the terminal in a talk mode, the communication apparatus can have the user to touch the outside of the command input region of the touch panel by means of part of a palm or part of an earlobe or a neighboring part thereof. Then, as a result, any situation where a command is unintentionally input can be avoided if the command input region is touched at the inside thereof by part of a palm or a cheek of the user's face so long as part of a palm or a cheek of the user's face is held in touch with the outside of the command input region.

In another aspect of the invention, there is provided a communication apparatus for communicating with another apparatus, including: a touch panel having part of a surface thereof adapted to be used as command input region for inputting a command, the command input region of the surface being adapted to be touched in the inside to input a command, the touch panel outputting touch position detection data in response to at least two touches given respectively to two spots on the surface for locating at least the two touch positions; and a command nullifying section for nullifying the command input by a touch given to the inside of the command input region while the outside of the command input region of the surface of the touch panel is being touched according to the touch position detection data output in response to a touch given to the outside of the command input region of the surface of the touch panel if the inside of the command input region is touched while the outside of the command input region is being touched, in a talk mode.

Thus, according to another aspect of the present invention, when the outside of the command input region of the touch panel is touched by part of a palm or part of an earlobe or a neighboring part thereof while the user holds the communication apparatus, covering the surface of the touch panel with a palm, or in response to an incoming call or while the user's face is brought close to the surface of the touch panel to talk to the terminal in a talk mode, any situation where a command is unintentionally input can be avoided if the command input region is touched at the inside thereof by part of a palm or a cheek of the user's face during the touch.

As described above, according to the present invention, there is provided a communication apparatus for communicating with another apparatus. The apparatus includes a touch panel to be used to input a command by touching the surface thereof having an oblong profile that is short in one direction relative to the other direction orthogonal thereto, the touch panel being adapted to output touch position detection data in response to a touch given to a spot on the surface thereof for locating the touch position but not to output any touch position detection data when some other spot on the surface is touched while the spot is being touched, a speaker arranged outside and near one of the edges of the touch panel running in the one direction and a microphone arranged outside and near the other edge of the touch panel running in the one direction, the touch panel providing a command input region for inputting a command in at least a part of the surface thereof arranged along the other direction and close to the other edge in a talk mode. Thus, according to the present invention, when the user holds the communication apparatus, covering the surface of the touch panel with a palm, or in response to an incoming call or when the user's face is brought close to the surface of the touch panel to talk to the terminal in a talk mode, the communication apparatus can have the user touch the outside of the command input region of the touch panel by means of part of a palm or part of an earlobe or a neighboring part thereof. Then, as a result, any situation where a command is unintentionally input can be avoided if the command input region is touched at the inside thereof by part of a palm or a cheek of the user's face so long as part of a palm or a cheek of the user's face is held in touch with the outside of the command input region. Therefore, it is now possible to provide a communication apparatus that can avoid any operation error in a talk mode.

As described above, according to the present invention, there is provided a communication apparatus for communicating with another apparatus. The apparatus includes a touch panel having part of the surface thereof adapted to be used as command input region for inputting a command, the command input region of the surface being adapted to be touched in the inside to input a command, the touch panel outputting touch position detection data in response to at least two touches given respectively to two spots on the surface for locating the at least the two touch positions and a command nullifying section for nullifying the command input by a touch given to the inside of the command input region while the outside of the command input region of the surface of the touch panel is being touched according to the touch position detection data output in response to a touch given to the outside of the command input region of the surface of the touch panel if the inside of the command input region is touched while the outside of the command input region is being touched. Thus, according to the present invention, when the outside of the command input region of the touch panel is touched by part of a palm or part of an earlobe or a neighboring part thereof while the user holds the communication apparatus, covering the surface of the touch panel with a palm, or in response to an incoming call or while the user's face is brought close to the surface of the touch panel to talk to the terminal in a talk mode, any situation where a command is unintentionally input can be avoided if the command input region is touched at the inside thereof by part of a palm or a cheek of the user's face during the touch. Therefore, it is now possible to provide a communication apparatus, an input control method and an input control program that can avoid any operation error in a talk mode.

The nature, principle and utility of the invention will become more apparent from the following detailed description when read in conjunction with the accompanying drawings in which like parts are designated by like reference numerals or characters.

DETAILED DESCRIPTION OF THE PREFERRED EMBODIMENTS

Now, a preferred embodiment of the present invention will be described in greater detail by referring to the accompanying drawings.

Figure 1:
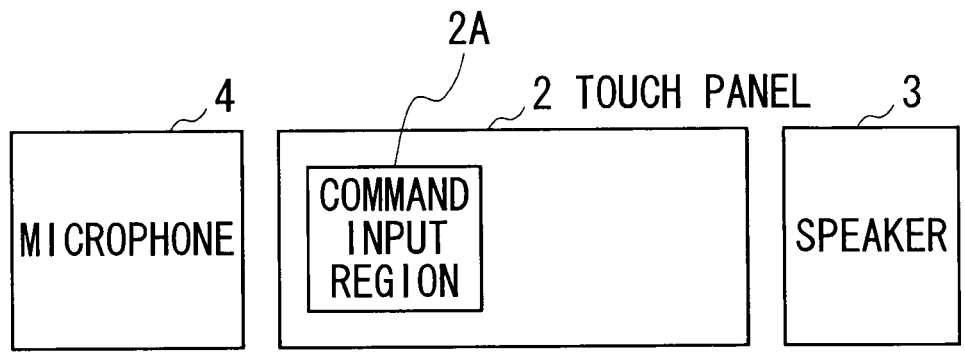
FIG. 1 is a schematic block diagram of a first communication apparatus according to an embodiment of the present invention, showing an overview of the configuration thereof.

(1) Overview of Communication Apparatus According to Present Invention (1-1) Overview of First Communication Apparatus Referring to FIG. 1, 1 generally denotes a first communication apparatus according to an embodiment of the present invention. The first communication apparatus 1 has functional features for communicating with other apparatus.

The touch panel 2 of the first communication apparatus 1 has an oblong surface that is short in one direction relative to the other direction orthogonal thereto and is adapted to be touched for inputting a command. When the touch panel is touched at a spot on the surface thereof, it outputs touch position detection data for locating the touch position of the spot, or the first spot. However, when the touch panel is touched at another spot, or the second spot, on the surface thereof while it is being touched at the first spot, it does not output any touch position detection data for locating the touch position of the second spot.

The speaker 3 of the first communication apparatus 1 is arranged outside and near an edge of the surface of the touch panel 2 that is orthogonal relative to the other direction.

The microphone 4 of the first communication apparatus 1 is arranged outside and near the other edge of the surface of the touch panel 2 that is orthogonal relative to the other direction.

At least a part of the touch panel 2 located near the other edge of the surface of the first communication apparatus 1 that is orthogonal relative to the other direction is made to operate as command input region 2A for inputting a command in a talk mode.

With the above-described arrangement, when the user holds the first communication apparatus 1, covering the surface of the touch panel with a palm, or in response to an incoming call or when the user's face is brought close to the surface of the touch panel 2 to talk through the terminal in a talk mode, the first communication apparatus 1 can have the user touch the outside of the command input region 2A of the touch panel 2 by means of part of a palm or part of an earlobe or a neighboring part thereof.

Then, as a result, any situation where a command is unintentionally input can be avoided if the command input region 2A of the first communication apparatus 1 is touched at the inside thereof by part of a palm or a cheek of the user's face so long as part of a palm or a cheek of the user's face is held in touch with the outside of the command input region 2A. Therefore, the first communication apparatus 1 can avoid any operation error in a talk mode.

(1-2) Overview of Second Communication Apparatus

Figure 2:
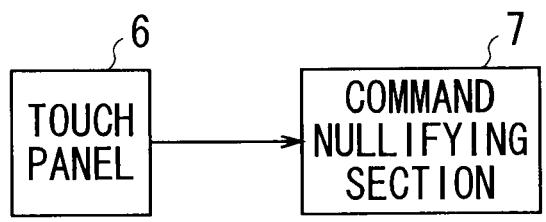
FIG. 2 is a schematic block diagram of the second communication apparatus according to an embodiment of the present invention, showing an overview of the configuration thereof.

Referring to FIG. 2, 5 generally denotes a second communication apparatus according to an embodiment of the present invention. The second communication apparatus 5 has functional features for communicating with other apparatus.

The touch panel 6 of the second communication apparatus 5 has a surface a part of which is adapted to be touched for inputting a command as a command input region. When the touch panel is touched at least at two spots on the surface thereof, it outputs touch position detection data for locating the positions of the at least two spots.

Additionally, the second communication apparatus 5 has a command nullifying section 7. When the command input region is touched at the inside thereof while the outside of the command input region of the surface of the touch panel 6 is being touched in a talk mode, the command nullifying section 7 nullifies the command input by the touch given to the inside of the command input region while the outside of the command input region of the surface of the touch panel 6 is being touched according to the touch position detection data output in response to the touch given to the outside of the command input region of the surface of the touch panel 6.

With the above-described arrangement, when the outside of the command input region of the touch panel 6 is touched by part of a palm or part of an earlobe or a neighboring part thereof while the user holds the second communication apparatus 5, covering the surface of the touch panel 6 with a palm, or in response to an incoming call or while the user's face is brought close to the surface of the touch panel 6 to talk to the terminal in a talk mode, any situation where a command is unintentionally input can be avoided if the command input region is touched at the inside thereof by part of a palm or a cheek of the user's face during the touch. Therefore, the second communication apparatus 5 also can avoid any operation error in a talk mode.

Figure 3A:
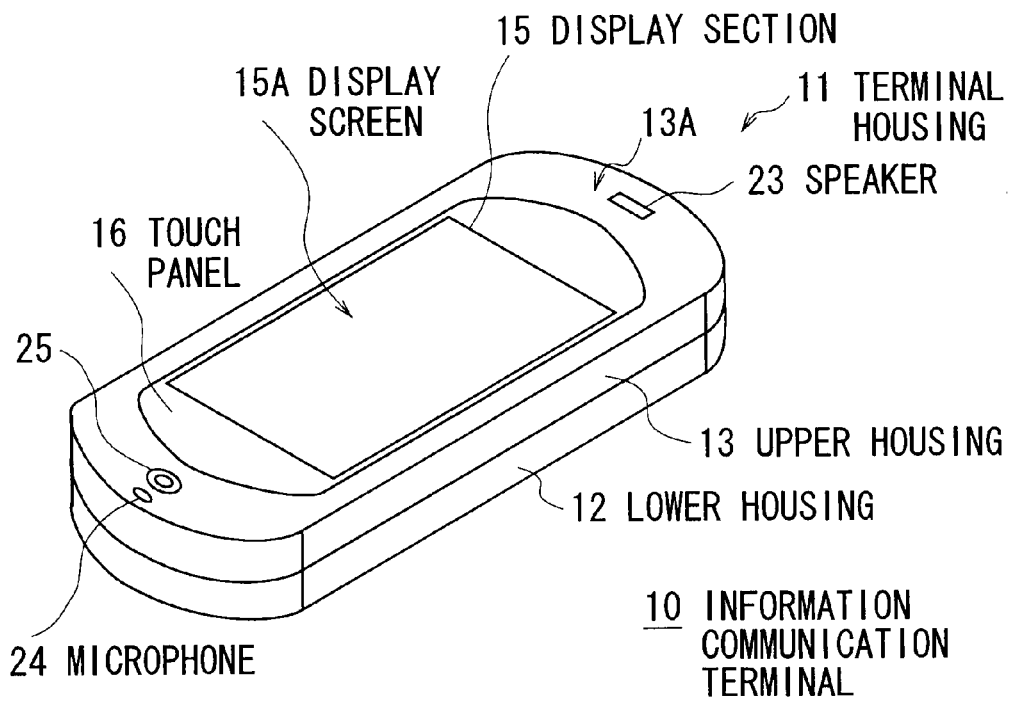
FIGS. 3A and 3B are schematic perspective views showing the appearance of a portable information communication terminal, which is communication apparatus according to an embodiment of the present invention.
Figure 3B:
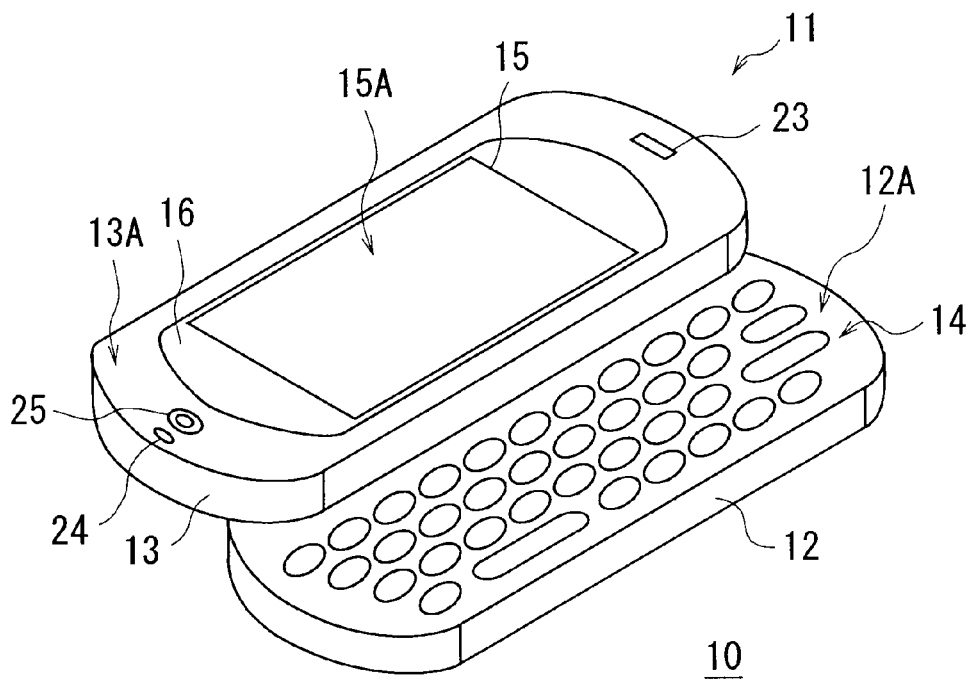
Figure 10:
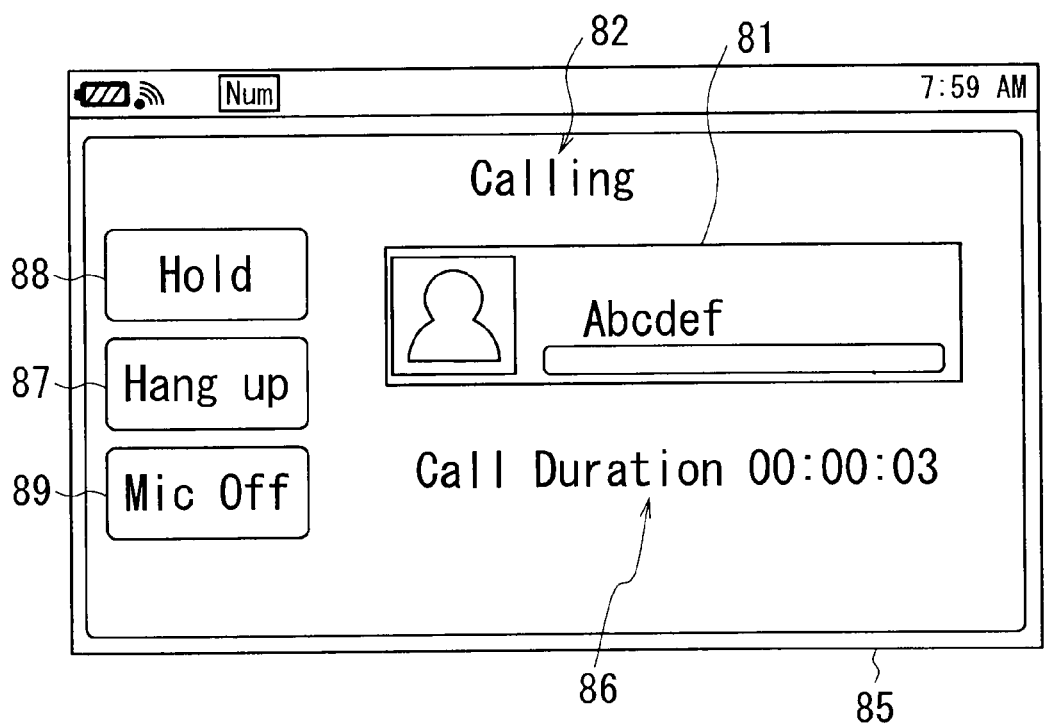
FIG. 10 is a schematic illustration of a talk notification image, showing the configuration thereof.

(2) Embodiments (2-1) Appearance/Configuration of Information Communication Terminal Now, referring to FIGS. 3A and 3B, 10 generally denotes a portable information communication terminal realized by applying a communication apparatus according to an embodiment of the present invention. The information communication terminal 10 has a functional feature of transmitting an electronic mail message to and receiving an electronic mail message from an external apparatus such as a personal computer or some other information communication terminal by way of the Internet.

The information communication terminal 10 also has an Internet Protocol (IP) telephone feature for realizing a telephone conversation between the user and the person at the other end of communication line, or the communication partner, by way of the Internet and a functional feature of realizing a wireless or wired direct communication with an external apparatus.

Additionally, the information communication terminal 10 has a data storage feature of acquiring music data and image data from a server on the Internet or an external apparatus and storing them and a reproduction feature of reproducing any of the music data and the image data stored by means of the data storage feature so that the user can enjoy music and/or images.

Still additionally, the information communication terminal 10 realizes various functional features so as to have an information viewing feature of viewing various pieces of information provided by servers on the Internet.

The information communication terminal 10 includes a terminal housing 11 that is a substantially flat rectangular parallelepiped and shows a race-track-like profile with oblong opposite major surfaces that are short in one direction than in the other direction orthogonal relative to the one direction.

Note that, in the following description, the one direction is also referred to as terminal transversal direction because the terminal housing 11 is relatively short in that direction. In the following direction, the other direction is also referred to as terminal longitudinal direction because the terminal housing 11 is longer in that direction that in the transversal direction.

The terminal housing 11 has a length in the longitudinal direction of the housing that is longer than the width of an ordinary palm. Additionally, the terminal housing 11 has a width in the transversal direction of the housing that is substantially equal to the length of an ordinary palm.

Thus, the terminal housing 11 has such a size that the user can hold it by a single hand, although the one end and the other end thereof in the longitudinal direction of the housing may come out from the index finger side and the little finger of a palm.

The terminal housing 11 includes a one surface side housing (to be also referred to as upper housing hereinafter) 13 and an other surface side housing (to be also referred to as lower housing hereinafter) 12. The upper housing 13 can slide relative to the lower housing 12 in the terminal transversal direction.

A plurality of keys 14 by means of which characters (the alphabet letters and the Japanese hiraganas) and signs can be input are arranged on the upper surface 12A of the lower housing 12 facing the upper housing 13.

As the upper housing 13 is driven to slide and lie on the upper surface 12A of the lower housing 12, the terminal housing 11 that is a substantially flat rectangular parallelepiped is restored and the plurality of keys 14 are hidden from the outside.

On the other hand, as the upper housing 13 is driven to slide and move away from the upper surface 12A of the lower housing 12, the plurality of keys 14 are exposed to the outside and operated as those of a keyboard.

Thus, as the upper housing 13 is driven to slide relative to the lower housing 12 to expose the plurality of keys 14, any of various pieces of information such as the text of an electronic mail message or a time schedule can be input through the plurality of keys 14.

A rectangular display screen 15A is arranged on the upper surface 13A of the upper housing 13 that is also the upper surface of the terminal housing 11 with its longitudinal direction (to be also referred to as display screen longitudinal direction hereinafter) running in parallel with the longitudinal direction of the terminal.

Thus, the terminal housing 11 displays any of various pieces of information it can acquire from an external apparatus or a server on the Internet on the display screen 15A of the display section 15 so that the user can see it.

When the upper housing 13 of the terminal housing 11 is driven to slide relative to the lower housing 12 so that the lower housing 12 can be used as keyboard, it also displays the pieces of information input through the plurality of keys 14 of the lower housing 12 on the display screen 15A of the display section 15 as a display image.

Additionally, the terminal housing 11 can display a graphic user interface (GUI) image having display elements (to be referred to as icons hereinafter) representing various commands that can be input or some other image on the display screen 15A of the display section 15 as a display image.

The upper housing 13 has a substantially transparent touch panel 16 having a race-track-like profile that is larger than the display screen 15A of the display section 15 and arranged at the center of the upper surface 13A thereof in such a way that the longitudinal direction of the touch panel 16 (to be also referred to as panel longitudinal direction hereinafter) runs in parallel with the terminal longitudinal direction and cover the display screen 15A and its surrounding area.

As the terminal housing 11 displays a display image on the display screen 15A of the display section 15, it can show the icons in the display image through the touch panel 16 to the outside. The region of the surface of the touch panel 16 that correspond to an icon is a region where the command represented by the icon can be input (to be also referred to as command input region hereinafter).

Thus, as a command input region of the surface of the touch panel 16 is touched and depressed by a finger tip or a stylus pen (an action of touching and depressing the surface of the touch panel 16 is referred to as a touch hereinafter) in a state where the display screen 15A of the display section 15 of the terminal housing 11 displays a display image, the command represented by the icon that is located vis-à-vis the touched command input region is input.

Figure 4:
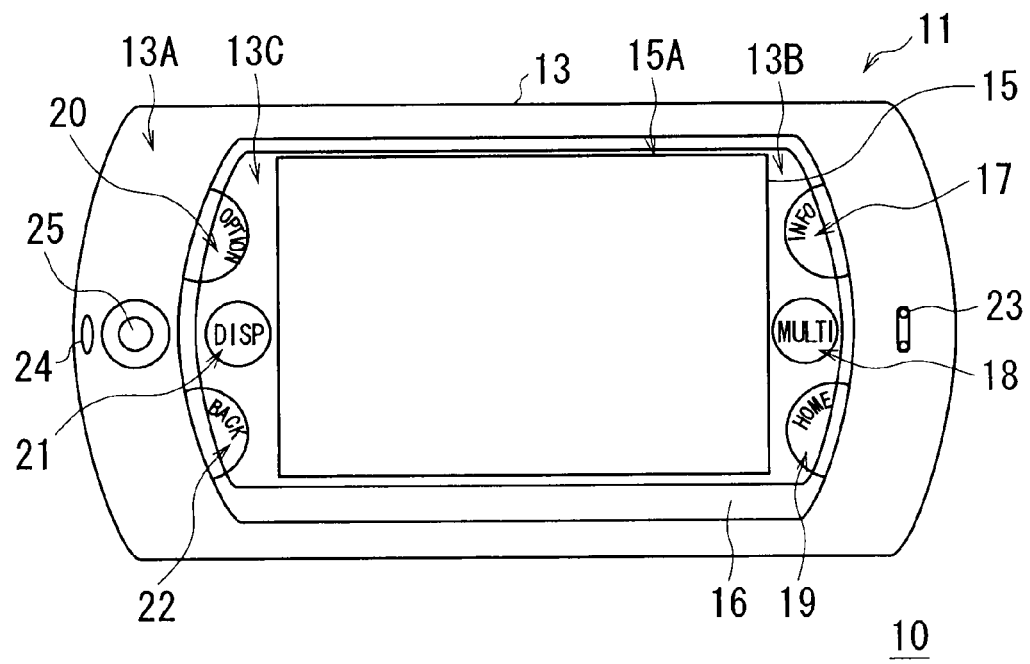
FIG. 4 is a schematic plan top view the embodiment of FIGS. 3A and 3B, showing the configuration of the panel cover part at an end and that of the panel cover part at the opposite end thereof.

Additionally, as shown in FIG. 4, buttons 17 through 22 for various commands are drawn in parts covered by the touch panel 16 and located off the display screen 15A of the display section 15 at the side of the one edge and at the side of the other edge on the upper surface 13A of the upper housing 13 (to be also referred to as the one edge side panel-covered part and the other edge side panel-covered part hereinafter) 13B and 13C.

More specifically, an information button 17 that represents an information presentation command for presenting the application program being executed is drawn in the one edge side panel-covered part 13B for the command that can be input by means the information button 17.

A multi-window button 18 that represents a multi-window display command for displaying a plurality of windows on the display screen 15A of the display section 15 is also drawn in the one edge side panel-covered part 13B for the command that can be input by means of the multi-window button 18.

A home button 19 that represents a menu image display command for displaying a main menu instead of the display image that is being displayed on the display screen 15A of the display section 15 is also drawn in the one edge side panel-covered part 13B for the command that can be input by means of the home button 19.

On the other hand, an option button 20 (or popup button) that represents a selection/setting image overlapping display command for displaying a selection/setting image that corresponds to the display image that is being displayed in an overlapping manner on the display screen 15A of the display section 15 is drawn in the other edge side panel-covered part 13C for the command that can be input by means of the option button 20.

A display button 21 that represents a selection/setting image display command for selecting/setting a luminance of the display image and a font of characters on the display screen 15A of the display section 15 is also drawn in the other edge side panel-covered part 13C for the command that can be input by means of the display button 21.

A back button 22 that represents a command for restoring the display image that was being displayed immediately before the display image 1 that is being displayed on the display screen 15A of the display section 15 is also drawn in the other edge side panel-covered part 13C for the command that can be input by means of the back button 22.

Additionally, when a spot facing a button in either of the regions of the surface of the touch panel 16 that corresponds to the various buttons 17 through 22 of the one edge side panel-covered part 13B and the other edge side panel-covered part 13C (to be also referred to as button-facing regions hereinafter) is touched, the command that corresponds to the button is input.

A speaker 23 is arranged outside and near one of the edges that are orthogonal relative to the panel longitudinal direction of the touch panel 16 on the upper surface 13A of the upper housing 13 (FIGS. 3A, 3B and 4) (and hence near the corresponding one of the edges relative to the terminal longitudinal direction of the upper surface 13A).

A microphone 24 is arranged outside and near the other edge that is orthogonal relative to the panel longitudinal direction of the touch panel 16 on the upper surface 13A of the upper housing 13 (and hence near the corresponding one of the edges relative to terminal longitudinal direction of the upper surface 13A).

Thus, as the user holds the terminal housing 11 by hand from the other surface side and brings the speaker near one of the ears, while bringing the microphone 24 close to the mouth for a talk, the communication partner's voice is output from the speaker 23 and the user's voice is collected by the microphone 24 to make the ongoing telephone conversation proceed successfully.

A four way directional key 25 that can be tilted at the pivot thereof and depressed for various operations is arranged near the microphone 24 on the top surface 13A of the upper housing 13.

As the four way directional key 25 is tilted at the pivot thereof relative to the upper surface 13A of the upper housing 13 from the upright position, one of the opposite directions in the terminal transversal direction is specified and input.

Similarly, as the four way directional key 25 is tilted at the pivot thereof relative to the upper surface 13A of the upper housing 13 from the upright position, one of the opposite directions in the terminal longitudinal direction is specified and input.

Additionally, as the four way directional key 25 is depressed at the pivot thereof from the upper surface 13A of the upper housing 13 toward the lower housing 12, a command is finalized and input.

Thus, with this arrangement, as the four way directional key 25 is tilted in a state where a display image is being displayed on the display screen 15A of the display section 15, the indication element for indicating an icon on the display image (to be also referred to as cursor hereinafter) is moved correspondingly in the direction in which the four way directional key 25 is tilted.

Additionally, as the four way directional key 25 is depressed in a state where a display image is being displayed on the display screen 15A of the display section 15 and one of the display elements is selected by means of the cursor, the terminal housing 11 determines that the selection of the icon by the cursor is finalized and inputs the command that the icon represents.

Figure 5:
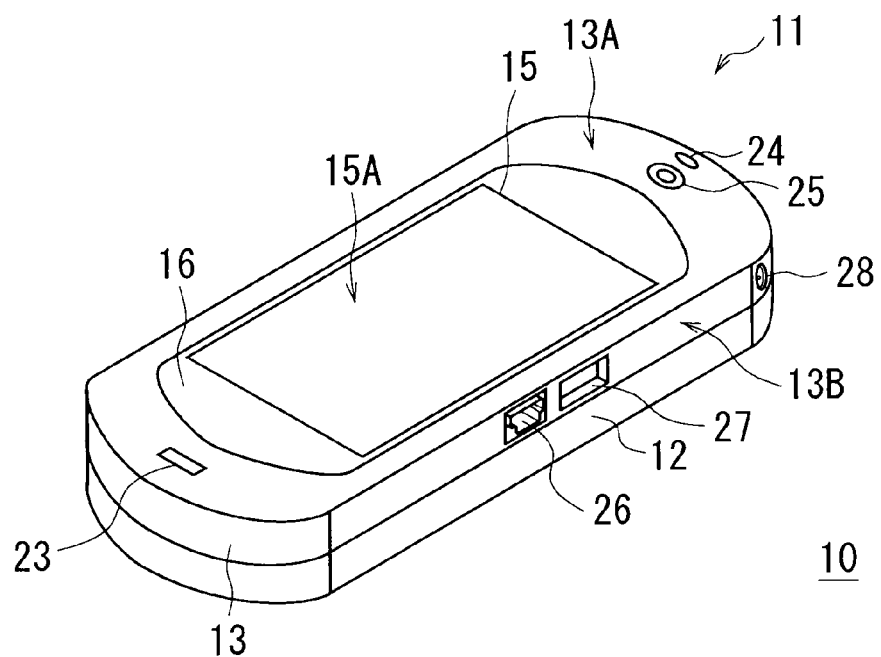
FIG. 5 is a schematic perspective view of the embodiment of FIGS. 3A and 3B, showing the configuration of a lateral surface of the upper housing member thereof.

Additionally, as shown in FIG. 5, a universal serial bus (USB) connector 26 and a connector jack 27 are arranged side by side at a middle section of the lateral surface 13B of the upper housing 13 running in parallel with the terminal longitudinal direction.

An USB cable (not shown) can be connected to the USB connector 26 of the upper housing 13 for wired communication with an external apparatus.

A headphone or a headset (not shown) having a function of inputting and outputting sounds (not shown) can be connected to the connector jack 27 of the upper housing 13.

While a headset is connected to the connector jack 27 of the terminal housing 11, the user can talk with the communication partner by means of the headset in place of the speaker 23 and the microphone 24.

Furthermore, a direct current (DC) jack 28 that can supply DC power is also arranged at the lateral surface 13B of the upper housing 13.

Thus, as a commercial power supply is connected to the DC jack 28 by way of an alternating current/direct current (AC/DC) adaptor (not shown), the terminal housing 11 can operate in response to the direct current power supplied from the commercial power supply through the AC/DC adaptor or charge the battery of the terminal housing (not shown).

(2-2) Circuit Configuration of Information Communication Terminal

Figure 6:
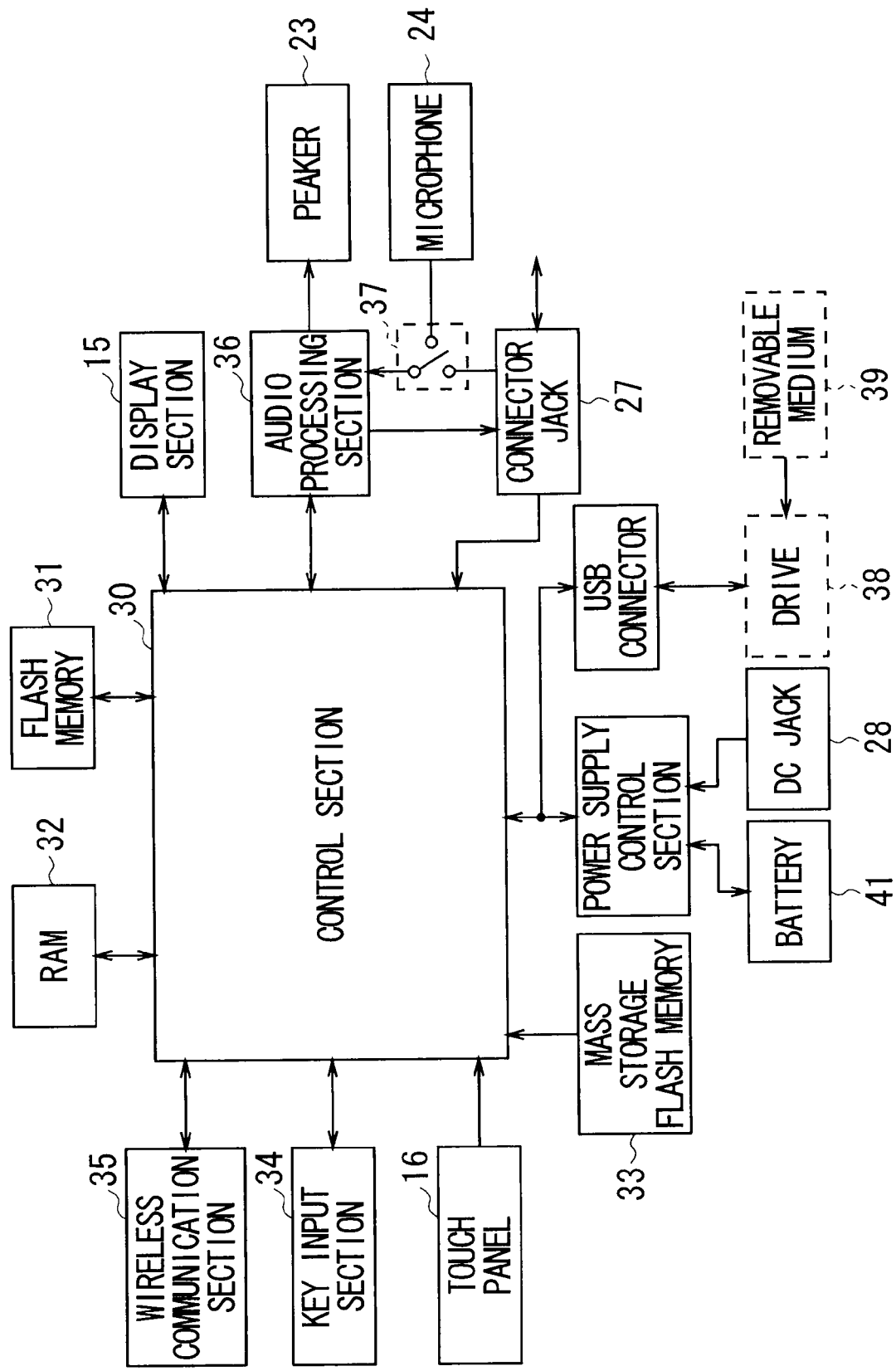
FIG. 6 is a schematic block diagram of the information communication terminal of FIGS. 3A and 3B, showing the circuit configuration thereof.

Now, the circuit configuration of the above-described information communication terminal 10 will be described below. Referring to FIG. 6, the information communication terminal 10 typically has a control section 30 formed by using a microprocessor.

The control section 30 reads out various programs including the basic program and any of the various application programs and input control programs stored in a flash memory 31 and develops them on a random access memory (RAM) 32, which may be a synchronous dynamic random access memory (SDRAM), to control the entire information communication terminal 10 and execute various processes.

Thus, the control section 30 can realize one of the above-described various features of the information communication terminal 10 including the electronic mail feature, the IP phone feature, the feature of communicating with external apparatus, the data storage feature, the reproduction feature, information viewing feature and so on by itself.

Additionally, the control section 30 can realize a plurality of features concurrently in parallel by executing a plurality of application programs also concurrently in parallel.

The control section 30 stores command determining data table to be also referred to for determining if one of the commands that the buttons 17 through 22 of the one edge side panel-covered part 13B and the other edge side panel-covered part 13C represent respectively (to be also referred to as covered part command determining table hereinafter) is input or not by way of the touch panel 16 in the flash memory 31 or the mass storage flash memory 33.

The cover panel command determining table is generated to show the commands that can be input and are represented respectively by the buttons 17 through 22 of the one edge side panel-covered part 13B and the other edge side panel-covered part 13C in association with the button-facing region data for indicating the positions of the button-facing regions disposed on the surface of the touch panel 16 vis-à-vis the respective buttons 17 through 22 by means of so many sets of coordinate values.

The control section 30 stores command determining data tables that correspond to the respective display images that can be displayed on the display screen 15A of the display section 5 for determining if one of the commands represented by the icons in one of the respective display images is input through the touch panel 16 or not (to be also referred to as image command determining tables hereinafter) in the flash memory 31 or the mass storage flash memory 33.

The image command determining tables are generated to show the commands that can be input and are represented respectively by the icons in each of the display images in association with the input region data for indicating the positions of the command input regions disposed on the surface of the touch panel 16 vis-à-vis the respective icons by means of so many sets of coordinate values.

The icons arranged in the display images include an input feature extending command for extending the input feature among others.

The icons arranged in the display images include a special icon that represents commands of two different categories such as a command that can be input in a state where the input feature should not be extended and a command that can be input in a state where the input feature is extended.

Thus, the image command determining table that corresponds to the display image where the special icon and the input feature extending icon are arranged (to be also referred to as special display image hereinafter) describes existence and non-existence of extension of the input feature as the input conditions of the above-described commands of the two different categories in association with the commands of the two different categories that the special icon represents and can be input.

When the control section 30 realizes a feature or a plurality of functions, it generates display image data and sends it out to the display section 15 so as to display a display image on the display screen 15A of the display section 15 according to the display image data.

The touch panel 16 of the information communication terminal 10 may typically be an electrostatic capacity type touch panel for detecting two touch positions.

As the touch panel 16 is touched in operation at a single spot on the surface thereof in a state where a display image is being displayed on the display screen 15A of the display section 15, it sends out touch position detecting data that corresponds to the touch position (to be also referred to as touch position hereinafter) so long as the single spot on the surface thereof is touched.

As the control section 30 receives the touch position detecting data from the touch panel 16, it detects the touch position of the single spot on the surface of the touch panel 16 as a set of coordinate values of the surface according to the touch position detecting data.

Then, the control section 30 compares the detected touch position with the button-facing region or the command input region that the button-facing region data and the input region data respectively indicate by referring to the covered part determining table and the image command determining table that corresponds to the display image being displayed on the display section 15.

By doing so, the control section 30 determines if the detected touch position is in the button-facing region or in the command input region or not.

If the control section 30 determines that the touch position is out of the button-facing region and also out of the command input region, it determines that no command is input by the touch on the surface of the touch panel 16.

If, on the other hand, the control section 30 determines that the touch position is in the button-facing region or in the command input region, it determines that the command that corresponds to the button-facing region or the command input region, whichever appropriate, that includes the touch position is input by the touch on the surface of the touch panel 16.

As the control section 30 determines the command input by the touch on the surface of the touch panel 16, it executes various processes which may include a process for switching the display image on the display screen 15A of the display section 15 and a process for communicating with an external apparatus according to the determined command.

Additionally, when the touch panel 16 is touched at a single spot on the surface thereof in a state where the display image is displayed on the display screen 15A of the display section 15 during the operation, it sends out touch position detecting data that corresponds to the touch position to the control section 30 so long as the single spot on the surface thereof is touched.

Further, when the touch panel 16 is touched at another single spot on the surface thereof in a state where it is already touched at the single spot, it also sends out touch position detecting data that corresponds to the additional touch position to the control section 30 so long as the additional single spot on the surface thereof is touched.

As the control section 30 sequentially receives the two touch position detecting data from the touch panel 16, it detects the touch positions of the two spots on the surface of the touch panel 16 as two sets of coordinate values of the surface according to the touch position detecting data.

Then, the control section 30 compares the detected two touch positions with the button-facing region or the command input region that the button-facing region data and the input region data respectively indicate by referring to the covered part determining table and the image command determining table that corresponds to the display image being displayed on the display section 15.

By doing so, the control section 30 determines if one of the detected touch positions is in the button-facing region or in the command input region or not and also if the other detected touch position is in the button-facing region or in the command input region or not.

If the control section 30 determines that both of the two touch positions are out of the button-facing region and also out of the command input region, it determines that no command is input by the touches at the two spots on the surface of the touch panel 16.

If, on the other hand, the control section 30 determines that one of the touch positions is in the button-facing region or in the command input region, it determines that the command that corresponds to the button-facing region or the command input region, whichever appropriate, that includes that touch position is input by the touch on the surface of the touch panel 16.

If, the control section 30 determines that one of the touch positions is in the button-facing region or in the command input region and the other touch position is also in the button-facing region or in the command input region, it determines that the command that corresponds to the button-facing region or the command input region, whichever appropriate, that includes the former touch position and the command that corresponds to the button-facing region or the command input region, whichever appropriate, that includes the latter touch position are input by the touches at the two spots on the surface of the touch panel 16 as a command of two different categories.

As the touch panel 16 is touched at one or two spots in the button-facing region or in the command input region on the surface thereof, the control section 30 determines the command input in response to the touch immediately after the touch given to the surface or at the time when the touch on the surface is released (in other words when the finger tip or the stylus pen is removed from the surface).

When the control section 30 determines that commands of two categories are input in response to the touch at the two spots on the surface of the touch panel 16, it executes various processes corresponding to the determined commands of the two categories.

When the touch panel 16 is touched at a single spot in the command input region facing a special icon on the surface thereof in a state where a special display image is being displayed on the display screen 15A of the display section 15, the control section 30 determines that one of the two commands of two categories that are represented by the special icon and can be input is actually input in response to the touch.

On the other hand, when the touch panel 16 is touched at a single spot in the command input region facing the input feature extending icon on the surface thereof, the control section 30 determines that the input feature extending command is input in response to the touch.

Then, when the spot in the command input region facing the special icon is additionally touched in the state where the touch panel 16 is touched at a single spot in the command input region facing the input feature extending icon on the surface thereof, the control section 30 determines that the other one of the two commands of the two categories that are represented by the special icon and can be input is actually input in response to the touch.

In this way, as the special display image is displayed on the display screen 15A of the display section 15, the control section 30 can discriminate the two commands of the two categories that are represented by the special icon and can be input and actually input them.

Note that, as the key input section 34 having the plurality of keys 14 and the four way directional key 25 as described above is operated by the user and operation data is given from the key input section 34 in response to the operation to realize a feature or a plurality of features, the control section 30 executes various processes corresponding to the operation data.

In this way, the control section 30 can directly communicate with an external apparatus such as a personal computer or some other information communication terminal by the wireless communication section 35 according to the feature of the wireless local area network (WLAN) typically conforming to the 802.11 Standard.

Additionally, the control section 30 can communicate with an external apparatus or a server on the Internet by the wireless communication section 35 sequentially by way of an access point and the Internet.

Then, when the control section 30 receives viewable data as display image data by way of the wireless communication section 35 as a result of the communication with an external apparatus of a server, it sends out the display image data to the display section 15 to make the display screen 15A of the display section 15 display the display image according to the display image data so that the user can view the viewable information.

Additionally, when the control section 30 receives music data and/or image date by way of the wireless communication section 35 as a result of the communication with an external apparatus or a server, it sends out the music data and/or the image data to the mass storage flash memory 33 and stores them there.

When the control section 30 reproduces such image data, it reads out the image data from the mass storage flash memory 33 and executes predetermined reproduction processes including a decoding process on them before it sends it out to the display section 15. In this way, the control section 30 can display the image on the display screen 15A of the display section 15 according to the image data so that the user can watch the image.

Meanwhile, the above-described connector jack 27 is connected to the control section 30 and a plurality of connection pins are typically arranged on the connector jack 27.

The connector jack 27 detects existence or non-existence of connection at each of the connection pins to a terminal of an external connector. Thus, the connector jack 27 detects if a headset or a headphone is connected thereto or not and notifies the control section 30 of the outcome of detection.

When the control section 30 reproduces music data, it reads out the music data from the mass storage flash memory 33 and sends it out to the audio processing section 36. The audio processing section 36 executes the reproduction processes including a decoding process, a digital/analog conversion process and an amplification process on the music data to produce a music signal.

Then, when no headphone is connected to the connector jack 27, the audio processing section 36 sends out the music signal to the speaker 23 to output music from the speaker 23 according to the music signal under the control of the control section 30 so that the user can listen to the music.

When, on the other hand, a headphone is connected to the connector jack 27, the audio processing section 36 sends out the music signal to the headphone by way of the connector jack 27 to output music from the headphone according to the music signal under the control of the control section 30 so that the user can listen to the music.

When no headset is connected to the connector jack 27 for the user to talk with the communication partner by means of IP telephone, the control section 30 takes the audio signal obtained by collecting the user's voice through the microphone 24 into the audio processing section 36 by way of the switching section 37.

Then, the audio processing section 36 produces sound data by executing predetermined processes including an analog/digital conversion process on the audio signal and subsequently sends out the produced sound data to the control section 30.

The control section 30 transmits the sound data to the external apparatus which may be a personal computer or an information communication terminal that the communication partner is operating from the wireless communication section 35 sequentially by way of an access point and the Internet.

Additionally, the control section 30 receives and takes in the sound data on the voice of the communication partner transmitted from the person's external apparatus by the wireless communication section 35 and sends out the taken in sound data to the audio processing section 36.

Then, the audio processing section 36 generates an audio signal by executing predetermined processes including a digital/analog conversion process and an amplification process on the sound data and sends out the generated audio signal to the speaker 23 under the control of the control section 30 to output the communication partner's voice from the speaker 23 according to the audio signal.

On the other hand, when a headset is connected to the connector jack 27 for the user to talk with the communication partner by means of IP telephone, the control section 30 takes the audio signal obtained by collecting the user's voice through the microphone arranged at the headset into the audio processing section 36 sequentially by way of the connector jack 27 and the switching section 37.

Then, the audio processing section 36 produces sound data by executing predetermined processes including an analog/digital conversion process on the audio signal and subsequently sends out the produced sound data to the control section 30.

The control section 30 transmits the sound data to the external apparatus that the communication partner is operating from the wireless communication section 35 sequentially by way of an access point and the Internet.

Additionally, the control section 30 receives and takes in the sound data on the voice of the communication partner transmitted from the person's external apparatus by the wireless communication section 35 and sends out the taken in sound data to the audio processing section 36.

Then, the audio processing section 36 generates an audio signal by executing predetermined processes including a digital/analog conversion process and an amplification process on the sound data and sends out the generated audio signal to the headphone sequentially by the switching section 37 and the connector jack 27 under the control of the control section 30 to output the communication partner's voice from the headphone of the headset according to the audio signal.

Note that, when an incoming call is received by IP telephone, the control section 30 sends out ring tone data on the ring tone (that is, ringer) as an analog call signal to the speaker 23 or to the headphone of the headset sequentially by the switching section 37 and the connector jack 27 to output the ringing tone from the speaker 23 or the headphone of the headset, whichever appropriate, in order to notify the user of the incoming call.

The mass storage flash memory 33 stores registration information on other users to be used for exchanging information with any of the other users by means of a tool such as instant messenger, IP telephone, chat, electronic mail as data generated according to various application program in addition to sound data and image data.

Additionally, the mass storage flash memory 33 stores registration information on itself (the information communication terminal 10 it belongs and the user) to be sent out to the external apparatus that other users operate.

The drive 38 can also be connected to the USB connector 26 through an USB cable in addition to an external apparatus such as a personal computer or some other information communication apparatus.

Then, the control section 30 can take in the computer program it reads out from a removable medium 39, which may be a magnetic disk, an optical disk, a magneto-optical disk or a semiconductor memory, mounted on the drive 38 by way of the USB connector 26 and install it in the flash memory 31.

Additionally, when DC power is externally supplied by way of the DC jack 28, the control section 30 takes the DC power into the power supply control section 40 and supplies the power to the component sections of the information communication terminal 10 to drive those sections to operate.

Furthermore, when DC power is externally supplied by way of the DC jack 28, the control section 30 takes the DC power into the power supply control section 40 and supplies power to the battery 41 mounted in the information communication terminal 10 to electrically charge the battery 41.

When no DC power supply is externally supplied, the control section 30 takes in the power supplied from the battery 41 and supplies it to the component sections of the information communication terminal 10 to drive those sections to operate.

Additionally, when the information communication terminal 10 is connected to a personal computer, for example, by way of the USB connector 26, the control section 30 takes in the DC power supplied from the personal computer into the power supply control section 40 once and then supplies the power to the component sections of the information communication terminal 10 to drive those sections to operate.

(2-3) Talk Process in Talk Mode

Now, the talk process in a talk mode for the user to realize the IP telephone feature and talk with the communication partner will be described below.

The control section 30 stores an address list generated by associating address information for IP telephone on the addresses assigned to the information communication terminals and the external apparatus such as personal computers that one or more than one other users operate for communication with user information on the names and the contact points (telephone numbers) of the other users.

When the control section 30 is required to communicate with an external apparatus in response to a touch given to the touch panel 16 in a state where a predetermined display image is being displayed on the display screen 15A of the display section 15, it reads out the address list from the mass storage flash memory 33.

Then, the control section 30 generates display image data for prompting the user to select a communication partner by referring to the names of the users in the address list (to be also referred to as communication partner selection image data hereinafter).

Figure 7:
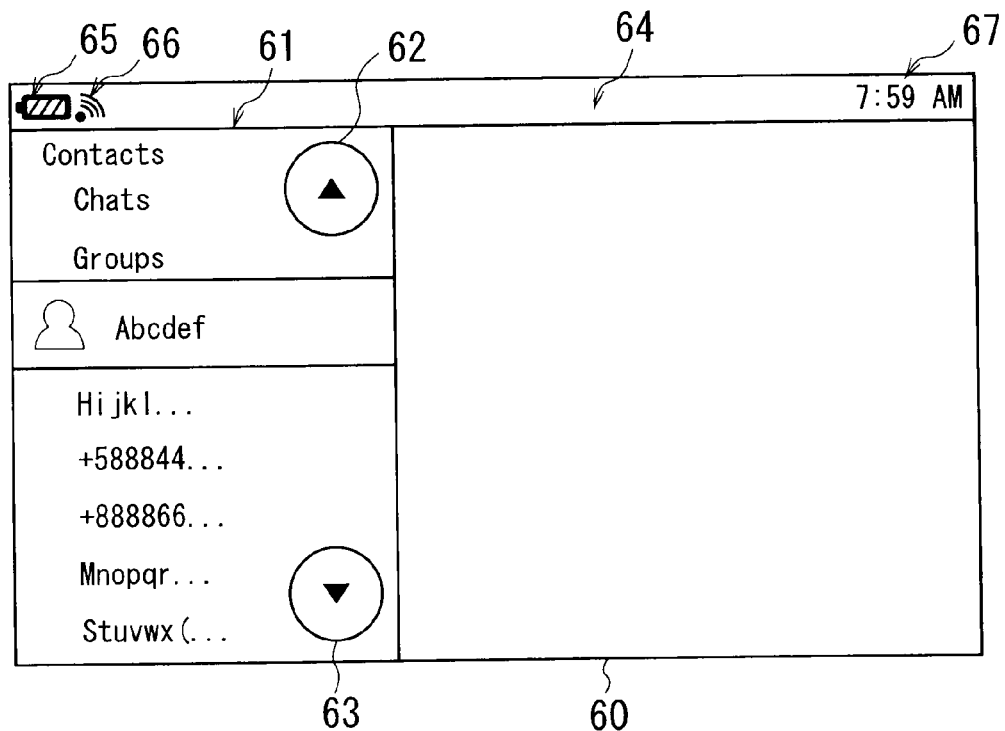
FIG. 7 is a schematic illustration of communication partner selection image (1), showing the configuration thereof.

Subsequently, the control section 30 sends out the communication partner selection image data to the display section 15 to have the latter display a display image as shown in FIG. 7 (to be also referred to as communication partner selection image) according to the communication partner selection image data on the display screen 15A of the display section 15.

The communication partner selection image 60 shows the names and other data of a plurality of other users who operate external apparatus that can be used for communication as a list 61 of a plurality of lines in a left side part of the image located close to the microphone 24 in the longitudinal direction of the display screen (or the other edge side of the terminal housing 11 in the longitudinal direction of the housing).

Scroll buttons 62 and 63 for displaying a hidden part of the list that is not currently displayed in the communication partner selection image 60 are arranged and fixed to the respective positions on the list so as to scroll up or down the list 61 on the screen.

Note that a belt-like task bar 64 is arranged at the top of the communication partner selection image 60 so as to extend from the left edge (to be also referred to as image left edge hereinafter) to the right edge (to be also referred to as image right edge hereinafter) located close to the speaker 23 in the longitudinal direction of the display screen (and hence at the one edge side of the terminal housing 11 in the longitudinal direction of the housing).

An icon 65 indicating the remaining power of the battery 41, an icon 66 indicating the intensity of the electric wave being received by the wireless communication section 35, an icon 67 showing the current clock time and other icons are displayed on the task bar 64.

Thus, as the touch panel 16 is touched in the command input region that faces the scroll button 62 or 63 on the surface thereof, the control section 30 scrolls the list 61 up or down, whichever appropriate, in the communication partner selection image 60 accordingly.

Additionally, as a region on the surface of the touch panel 16 that faces a line of the list 61 in the communication partner selection image 60 (and hence a line showing the name of the selected one of the other users) is touched, the control section 30 recognizes the user who corresponds to the touched region (and hence the other user selected by the user) as a communication partner.

Then, the control section 30 processes the communication partner selection image data according to the user information on the user selected as a communication partner in the address list and sends out processed data to the display section 15.

Figure 8:
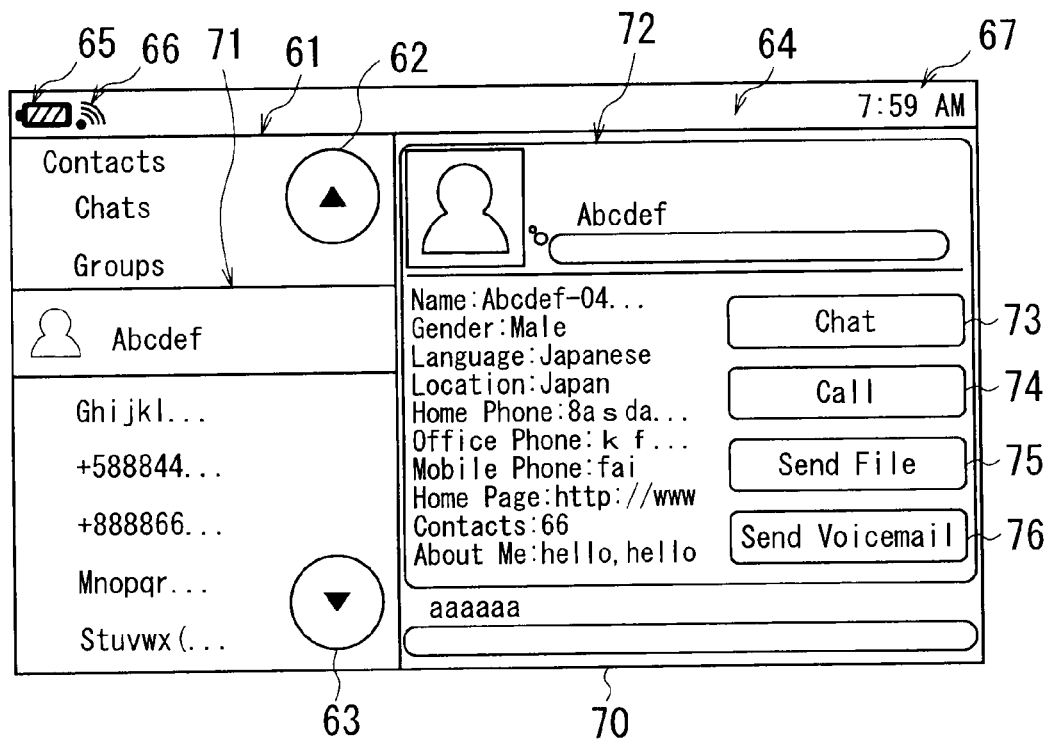
FIG. 8 is a schematic illustration of communication partner selection image (2), showing the configuration thereof.

Accordingly, the control section 30 displays the communication partner selection image 70 as shown in FIG. 8 according to the processed communication partner selection image data on the display screen 15A of the display section 15.

Then, the line showing the name of the other user selected by the user as a communication partner is enclosed with a frame 71 so as to be emphatically displayed so that the user can confirm the name of the other user selected as the communication partner.

A window (to be also referred to as communication partner window hereinafter) 72 for displaying user information on the other user selected by the user as the communication partner is displayed in a right side part of the communication partner selection image 70.

The communication partner window 72 shows the name, the home telephone number, the office telephone number and the telephone number of the portable telephone of the other user selected as the communication partner.

The communication partner window 72 also shows a chat selection icon 37 indicating the chat feature, an IP telephone selection icon 74 indicating the IP telephone feature, a file transmission selection icon 75 indicating the feature of file transmission and a voice mail selection icon 76 indicating the voice mail feature as so many selectable communication modes that the user can use to communicate with the external apparatus that the other user, who is selected as the communication partner, operates.

As the touch panel 16 is touched in the command input region facing the IP telephone selection icon 74 in the communication partner window 72 on the surface thereof, the control section 30 determines that the call command is input to direct to make an IP telephone call to the external apparatus that the communication partner, who is selected as a communication partner, operates in order to talk with the other user by IP telephone.

As the call command is input in this way, the control section 30 moves into a talk mode. Then, the control section 30 produces an outgoing call data that contains the IP telephone address information on the address assigned to the external communication apparatus that the communication partner operates and the IP telephone address information on the address assigned to the own information communication terminal 10.

Then, the control section 30 transmits the outgoing call data to the external communication apparatus that the communication partner operates by the wireless communication section 35 sequentially by way of an access point and the Internet. Then, the control section 30 notifies the communication partner of the call through the external communication apparatus.

As the control section 30 moves into a talk mode, it produces display image data for notifying the user of the call made to the communication partner (to be also referred to as outgoing call notification image data hereinafter) and sends it out to the display section 15.

Figure 9:
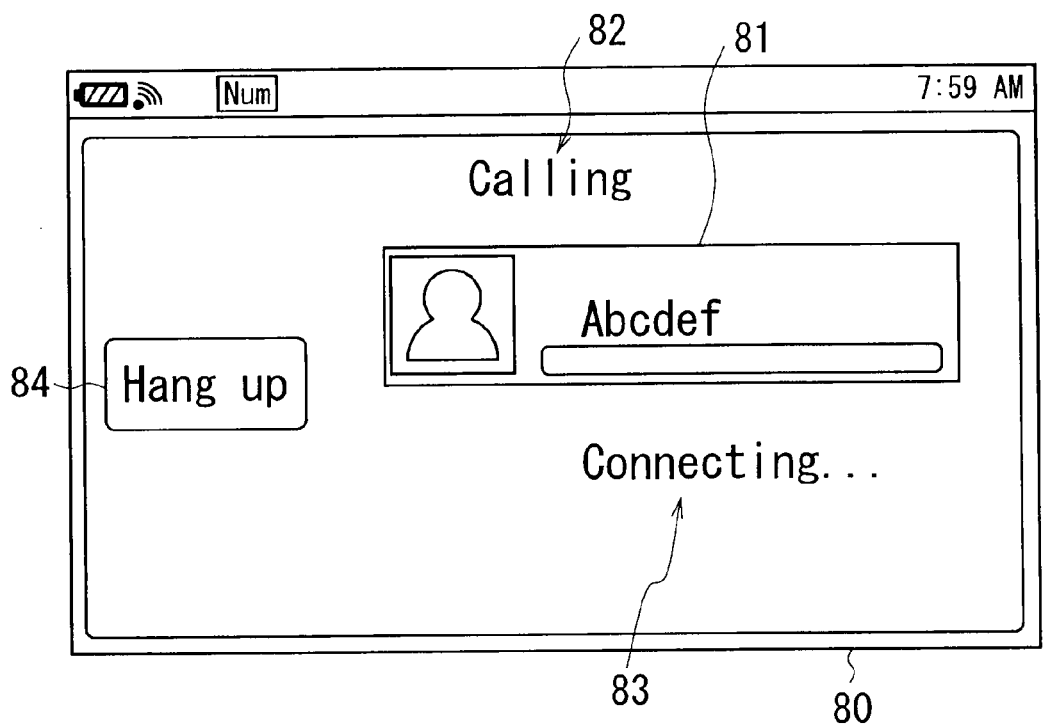
FIG. 9 is a schematic illustration of an outgoing call notification image, showing the configuration thereof.

Then, the control section 30 displays a display image as shown in FIG. 9 (to be also referred to as outgoing call notification image hereinafter) according to the outgoing call notification image data on the display screen 15A of the display section 15, in place of the communication partner selection image 70.

In an outgoing call notification image 80, a name 81 of the communication partner who is being called for a talk is displayed from a central part to a right part of the image.

The outgoing call notification image 80 also shows alphabetical letters 82 "Calling" above the name 81, telling that the user is making the IP telephone call, and alphabetical letters 83 "Connecting" below the name 81, telling that IP telephone is ringing at the other end of communication channel.

Additionally, the outgoing call notification image 80 shows a clear-back icon 84 representing a clear-back command (off-hook command) that can be input for interrupting the ring at the other end of communication channel near the left edge of the image.

So long as the control section 30 is calling the communication partner, it keeps on displaying the outgoing call notification image 80 on the display screen 15A of the display section 15 to notify the user that IP telephone is ringing at the other end of the communication channel.

Then, as the response command (on-hook command) for responding the IP telephone call is input at the external communication apparatus by the communication partner and response data is transmitted from the external communication apparatus by way of the Internet and an access point, the control section 30 receives and takes in the response data by the wireless communication section 35.

As a result, the control section 30 recognizes that telephone connection is established for a talk between the own information communication terminal 10 and the communication partner's external communication apparatus according to the response data.

Then, the control section 30 transmits the sound data obtained by collecting the user's voice by means of the microphone 24 to the communication partner's external communication apparatus by the wireless communication section 35 and, at the same time receives the sound data of the communication partner's voice by the wireless communication section 35 and outputs the communication partner's voice from the speaker 23 according to the communication partner's sound data.

In this way, the control section 30 can cause the user to make an IP telephone call to the communication partner and talk with the partner.

Meanwhile, as the communication partner accepts the IP telephone call and telephone connection is established for a talk between the own information communication terminal 10 and the communication partner's external communication apparatus, the control section 30 generates display image data for notifying the user that the telephone talk is effectively continuing (to be also referred to as talk notification image data hereinafter).

Then, the control section 30 displays a display image as shown in FIG. 10 (to be also referred to as on-talk notification image hereinafter) 85 on the display screen 15A of the display section 15, in place of the outgoing call notification image 80.

The talk notification image 85 shows the called communication partner's name that used to be displayed from a central part to a right part of the image in the outgoing call notification image 80 now as the communication partner's name 81 on the phone.

The talk notification image 85 also shows alphabetical letters 82 "Calling" above the name 81, telling that the user is making the IP telephone call and duration of the call 86 below the name 81.

The talk notification image 85 additionally shows a clear-back icon 87 representing the clear-back command that can be input to end the talk with the communication partner from the user side.

Furthermore, the talk notification image 85 shows near the left edge thereof a hold icon 88 representing a hold command that can be input for holding on and a sound collection temporary suspension icon 89 representing a sound collection temporary suspension command that can be input for temporarily suspending the operation of collecting the user's voice so as to make the communication partner unable to hear the user's voice and the sound around the user in addition to the clear-back icon 87.

The control section 30 makes the regions on the surface of the touch panel 16 that respectively face the clear-back icon 87, the hold icon 88 and the sound collection temporary suspension icon 89 appear as command input regions for inputting the clear-back command, the hold command and the sound collection temporary suspension command as long as it keeps on displaying the talk notification image 85 on the display screen 15A of the display section 15.

Thus, the control section 30 can have the user touch one of the command input regions on the touch panel 16 to input the clear-back command, the hold command or the sound collection temporary suspension command while he or she is talking on the IP telephone.

Additionally, the control section 30 keeps on displaying the talk notification image 85 on the display screen 15A of the display section 15 as long as the user is talking with the communication partner.

Therefore, if the user inputs the hold command through the touch panel 16 while he or she is talking with the communication partner in order to suspend the telephone conversation and temporarily do something other than the telephone talk, the control section 30 can notify the user that the call is still alive (and hence the talk with the communication partner has not been ended yet) by the talk notification image 85 that it keeps on displaying on the display screen 15A of the display section 15.

Additionally, if the user inputs the sound collection temporary suspension command through the touch panel 16 while he or she is on the IP telephone in order to temporarily talk to a person standing nearby, making the communication partner unable to hear the user's voice and the sound around the user, the control section 30 can notify the user that the call is still alive (and hence the talk with the communication partner has not been ended yet) by means of the talk notification image 85 that it keeps on displaying on the display screen 15A of the display section 15.

When the user inputs the clear-back command through the touch panel 16, the control section 30 generates clear-back notification data for notifying the end of the call.

Then, the control section 30 transmits the clear-back notification data to external communication apparatus that the communication partner is using by the wireless communication section 35 and by way of an access point and the Internet to notify the partner of the end of the call.

In this way, the control section 30 interrupts the talk communication between the own information communication terminal 10 and the external communication apparatus that the communication partner is using to end the telephone conversation between the user and the communication partner.

As the control section 30 interrupts the talk communication between the own information communication terminal 10 and the external communication apparatus that the communication partner is using to end the telephone conversion between the user and the communication partner, it generates display image data for notifying the user that the call to the communication partner is ended (to be also referred to as clear-back notification image data hereinafter) and sends it out to the display section 15.

Figure 11:
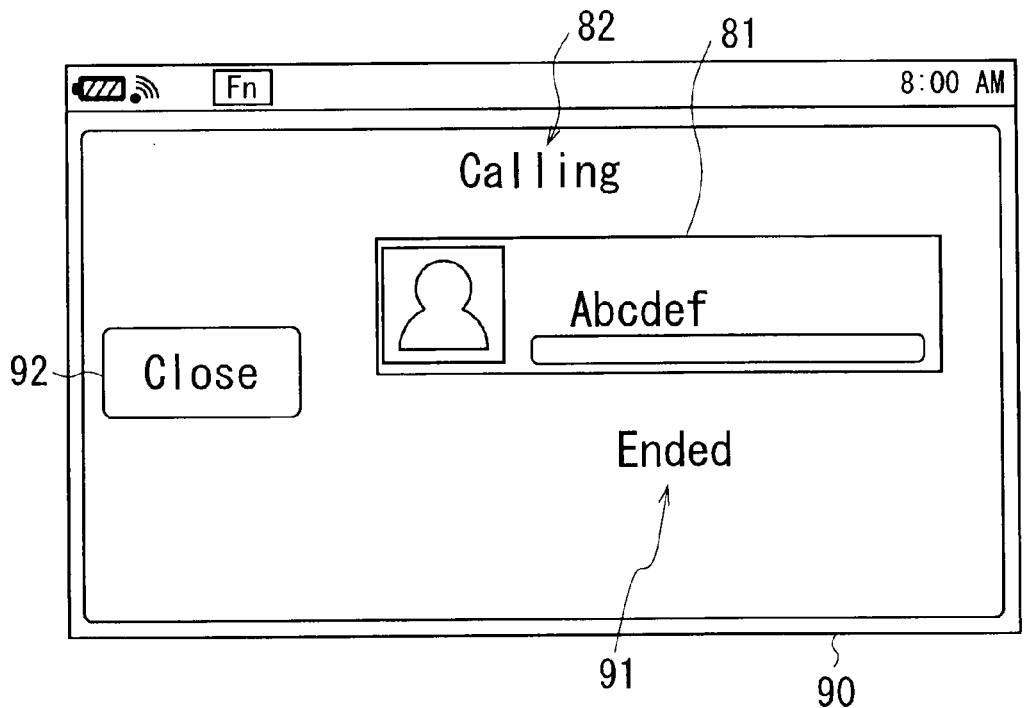
FIG. 11 is a schematic illustration of a clear-back notification image, showing the configuration thereof.

Then, the control section 30 displays a display image as shown in FIG. 11 (to be also referred to as clear-back notification image hereinafter) according to the clear-back notification image data to replace the talk notification image 85 on the display screen 15A of the display section 15.

The clear-back notification image 90 shows the called communication partner's name that used to be displayed from a central part to a right part of the image in the talk notification image 85 now as the communication partner's name 81 the communication with whom has been ended.

The clear-back notification image 90 also shows alphabetical letters 82 "Calling" above the name 81, telling that the user made the IP telephone call, and alphabetical letters 91 "Ended" below the name 81, telling that the IP telephone call is ended.

Additionally, the clear-back notification image 90 shows an end display icon 92 representing the end display command (to close the clear-back notification image 90) to end the display of the clear-back notification image 90 near the left edge of the image.

The control section 30 makes the region on the surface of the touch panel 16 that faces the end display icon 92 appear as command input region for inputting the end display command as long as it keeps on displaying the clear-back notification image 90 on the display screen 15A of the display section 15.

Thus, the control section 30 can have the user touch the command input region on the touch panel 16 to input the end display command while displaying the clear-back notification image 90 to the user.

Therefore, if the user inputs the end display command while the clear-back notification image 90 is being displayed to the user, the control section 30 ends the talk mode and displays back the communication partner selection image 60 or 70 that it used to display before the start of the call on the display screen 15A of the display section 15, in place of the clear-back notification image 90 (and hence ending the display of the clear-back notification image 90).

The control section 30 starts counting the time elapsed by the timer arranged in the inside since it starts displaying the clear-back notification image 90 on the display screen 15A of the display section 15.

If the end display command is not input when a predetermined period of time has elapsed since the start of displaying the clear-back notification image 90, the control section 30 ends the talk mode exactly at the time when the predetermined period of time has elapsed.

As the control section 30 ends the talk mode in this way, it also ends the display of the clear-back notification image 90 on the display screen 15A of the display section 15 and displays again the communication partner selection image 60 or 70 that it used to display before the start of the call on the display screen 15A.

The control section 30 makes the region on the surface of the touch panel 16 that faces the clear-back icon 84 appear as command input region for inputting the clear-back command as long as it keeps on displaying outgoing call notification image 80 on the display screen 15A of the display section 15.

Thus, the control section 30 can have the user input the clear-back command by touching the command input region on the touch panel 16 while he or she is calling the communication partner.

If the user inputs the clear-back command through the touch panel 16 to abruptly stop calling the communication partner although he of she has started calling the partner, the control section 30 generates outgoing call interruption data for interrupting the ring being emitted at the communication partner's external communication apparatus.

Then, the control section 30 transmits the call interruption data to the external communication apparatus that the communication partner operates by the wireless communication section 35 by way of an access point and the Internet and subsequently cuts off the communication and interrupts the outgoing call to the communication partner.

As the control section 30 interrupts the outgoing call to the communication partner, it displays the clear-back notification image 90, which is described above by referring to FIG. 11, on the display screen 15A of the display section 15, in place of the outgoing call notification image 80.

In this way, the control section 30 displays the clear-back notification image 90, which is also employed to notify the end of a talk, to notify the interruption of the outgoing call and ends the talk mode as in the instance described above by referring to FIG. 11.

On the other hand, if the control section 30 takes in the talk rejection data transmitted by the communication partner from the external communication apparatus by way of the Internet and an access point in response to a communication partner's action of inputting the talk rejection command while it is calling the communication partner, it cuts off the communication with the external communication apparatus and interrupts the outgoing call to the communication partner.

As the communication partner rejects the talk, the control section 30 displays the clear-back notification image 90, which is described above by referring to FIG. 11, on the display screen 15A of the display section 15, in place of the outgoing call notification image 80.

In this way, when a talk is rejected, the control section 30 also displays the clear-back notification image 90, which is also employed to notify the end of a talk, to notify the interruption of the outgoing call and ends the talk mode as in the instance described above by referring to FIG. 11.

Additionally, if the control section 30 receives and takes in the clear-back notification data transmitted from the external communication apparatus by way of the Internet and an access point in response to a communication partner's action of inputting the clear-back command before the user inputs the clear-back command while the user is talking with the communication partner, the control section 30 cuts off the communication for the talk between the own information communication terminal 10 with the external communication apparatus that the communication partner is operating to end the telephone conversation between the user and the communication partner.

As the control section 30 ends the call in response to the communication partner's action of inputting the clear-back command, it also displays the clear-back notification image 90 on the display screen 15A of the display section 15, in place of the talk notification image 85, to end the talk mode as in the instance described above by referring to FIG. 11.

On the other hand, as incoming call data storing IP telephone address information on the address assigned to the external communication apparatus from a communication partner's external apparatus requesting a call to the user (to be also referred to as external communication apparatus hereinafter) and IP telephone address information on the address assigned to the own information communication terminal 10 is transmitted to the control section 30 by way of the Internet and an access point, the control section 30 receives and takes in the incoming call data by means of the wireless communication section 35.

As the control section 30 receives the incoming call data, it shifts into a talk mode and detects the name of the communication partner who requests the call to the user according to the address list and the address information on the external communication apparatus contained in the incoming call data.

Then, the control section 30 generates display image data for notifying the user of the incoming call from the communication partner, using the detected communication partner's name, (to be also referred to as incoming call notification image data hereinafter) and sends it out to the display section 15.

Figure 12:
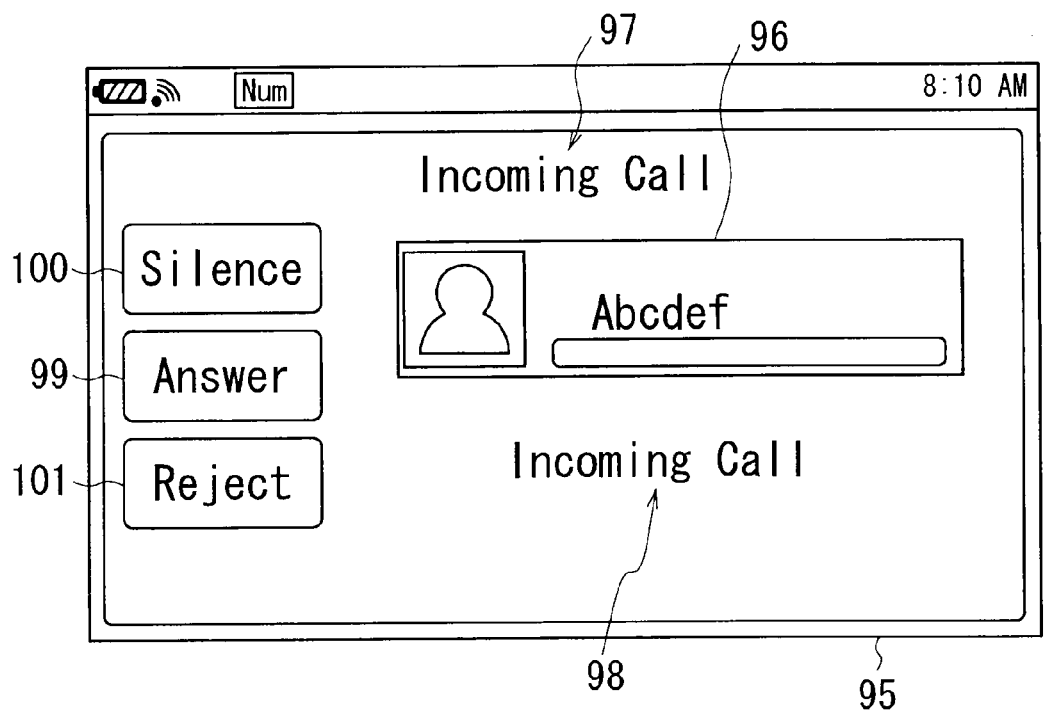
FIG. 12 is a schematic illustration of an incoming call notification image, showing the configuration thereof.

Then, the control section 30 displays the display image as shown in FIG. 12 (to be also referred to as incoming call notification image hereinafter) on the display screen 15A of the display section 15 according to the incoming call notification image data, in place of the display image that is currently being displayed on the display screen 15A of the display section 15.

An incoming call notification image 95 shows a name 96 of the communication partner requesting a call from a central part to a right part of the image.

The incoming call notification image 95 also shows alphabetical letters 97 "Incoming Call" above the name 96, telling that the user is being called by IP telephone from the communication partner, and alphabetical letters 98 "Incoming Call" below the name 96, telling also that the user is being called.

Additionally, the incoming call notification image 95 shows a response icon 99 representing the response command (on-hook command) that can be input for making a telephone conversation in response to the incoming call from the communication partner, near the left edge of the image.

Still additionally, the incoming call notification image 95 shows a mute icon 100 representing the silencing command that can be input to arbitrarily mute the ring sounding in response to the incoming call from the communication partner and a talk rejection icon 101 representing the talk rejection command that can be input to reject the request for a telephone conversation made by the communication partner along with the response icon 99.

Then, the control section 30 makes the regions on the surface of the touch panel 16 that respectively face the response icon 99, the mute icon 100 and the talk rejection 101 appear as command input regions for inputting the response command, the silencing command and the talk rejection command as long as it keeps on displaying the incoming call notification image 95 on the display screen 15A of the display section 15.

Thus, the control section 30 can have the user touch one of the command input regions on the touch panel 16 to input the response command, the silencing command or the talk rejection command.

Additionally, the control section 30 keeps on displaying the incoming call notification image 95 on the display screen 15A of the display section 15 as long as the information communication terminal 10 is ringing for the user in response to the incoming call from the communication partner.

As the response command is input by the user in order for the user to talk with the communication partner in response to the incoming call through the touch panel 16, the control section 30 generates response data.

Then, the control section 30 transmits the response data to the communication partner's external communication apparatus by the wireless communication section 35 sequentially by way of an access point and the Internet to establish telephone connection for a talk between the own information communication terminal 10 and the communication partner's external communication apparatus.

Subsequently, the control section 30 transmits the sound data obtained by collecting the user's voice by means of the microphone 24 to the communication partner's external communication apparatus by the wireless communication section 35, while it receives the sound data of the communication partner's voice also by the wireless communication section 35 and outputs the communication partner's voice from the speaker 23 in a manner as described earlier.

In this way, the control section 30 can have the user talk with the communication partner if the user receives an IP telephone call from the communication partner.

As the incoming call from the communication partner is accepted by the user and telephone connection is established for a talk between the own information communication terminal 10 and the communication partner's external communication apparatus, the control section 30 generates talk notification image data for notifying the user that he or she is talking with the communication partner and sends it out to the display section 15.

Figure 13:
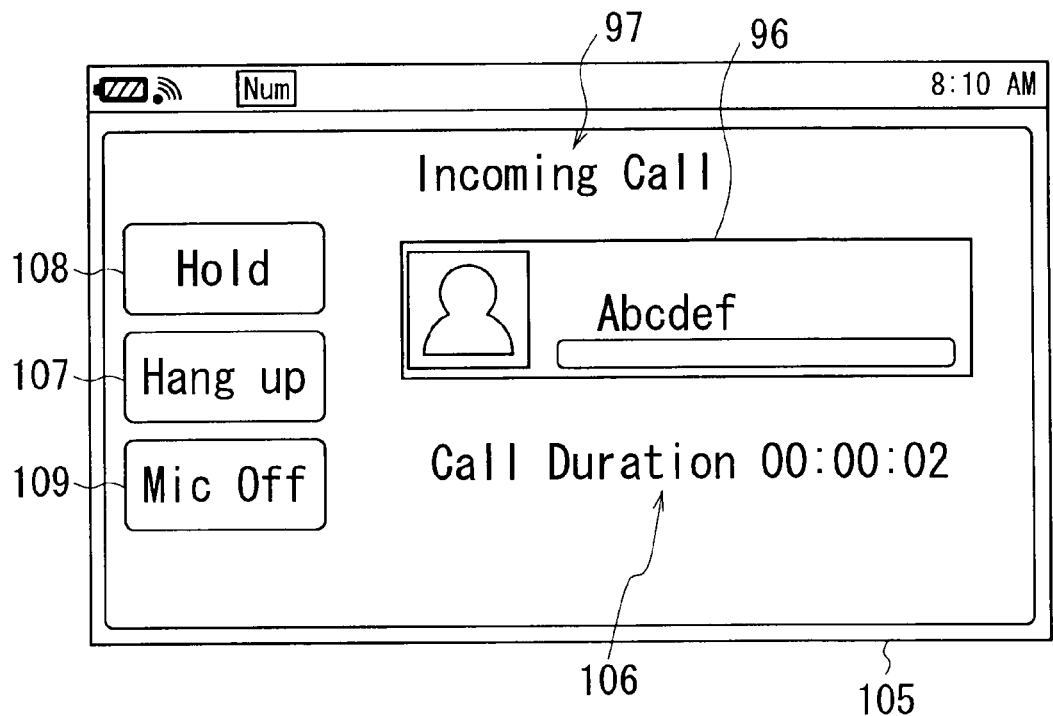
FIG. 13 is a schematic illustration of a talk notification image, showing the configuration thereof.

Then, the control section 30 displays a talk notification image 105 as shown in FIG. 13 according to the talk notification image data, in place of the incoming call notification image 95.

The talk notification image 105 shows the name of the communication partner who requested a telephone conversation that used to be displayed from a central part to a right part of the incoming call notification image 95 now as the communication partner's name 96.

The talk notification image 105 also shows alphabetical letters 97 "Incoming Call" above the name 96, telling that the user is being called by IP telephone from the communication partner, and duration of the call 106 below the name 96.

Additionally, the talk notification image 105 shows a clear-back icon 107 representing the clear-back command, a hold icon 108 representing the hold command and a sound collection temporary suspension icon 109 representing the sound collection temporary suspension command that can be input near the left edge of the image.

Then, the control section 30 makes the regions on the surface of the touch panel 16 that respectively face the clear-back icon 107, the hold icon 108 and the sound collection temporary suspension icon 109 appear as command input regions for inputting the clear-back command, the hold command and the sound collection temporary suspension command as long as it keeps on displaying the talk notification image 105 on the display screen 15A of the display section 15.

Thus, the control section 30 can have the user touch one of the command input regions on the touch panel 16 to input the clear-back command, the hold command or the sound collection temporary suspension command.

Additionally, the control section 30 keeps on displaying the talk notification image 105 on the display screen 15A of the display section 15 as long as the user is talking with the communication partner.

Thus, the control section 30 can notify the user that he or she is still talking with the communication partner (and hence the talk with the communication partner is not ended) by means of the talk notification image 105 that the display screen 15A of the display section 15 keeps on displaying even if the hold command is input by the user through the touch panel 16 to hold the talk.

Additionally, the control section 30 can notify the user that he or she is still talking with the communication partner (and hence the talk with the communication partner is not ended) by means of the talk notification image 105 that the display screen 15A of the display section 15 keeps on displaying even if the sound collection temporary suspension command is input by the user through the touch panel 16 in order to make communication partner unable to hear the user's voice and the sound around the user.

As the clear-back command is input by the user through the touch panel 16, the connected section 30 generates clear-back notification data for notifying the end of the call.

Then, the control section 30 transmits the clear-back notification data to the external communication apparatus that the communication partner is operating by the wireless communication section 35 by way of an access point and the Internet to notify the external communication apparatus of the end of the talk between the user and the communication partner.

Therefore, the control section 30 cuts off the talk communication between the own information communication terminal 10 and the external communication apparatus that the communication partner is operating to end the talk communication.

As the control section 30 cuts off the talk communication between the own information communication terminal 10 and the external communication apparatus that the communication partner is operating to end the talk between the user and the communication partner in this way, it generates clear-back notification image data for notifying the user of the end of the talk between the user and the communication partner and sends it out to the display section 15.

Figure 14:
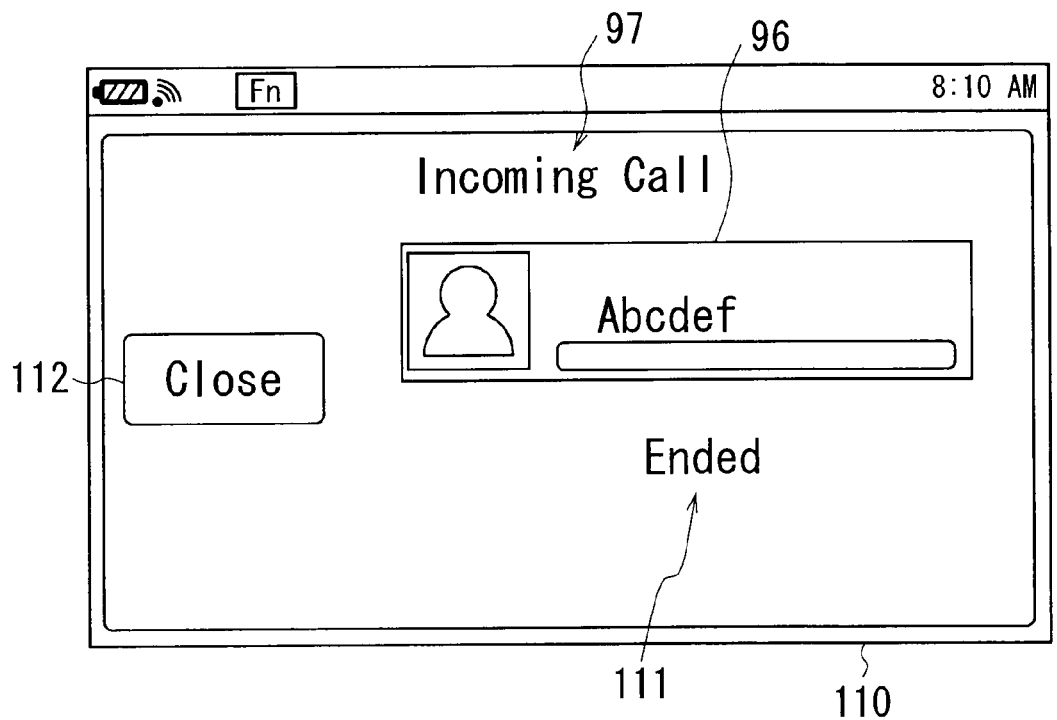
FIG. 14 is a schematic illustration of a clear-back notification image, showing the configuration thereof.

Then, the control section 30 displays a clear-back notification image 110 as shown in FIG. 14 on the display screen 15A of the display section 15 according to the clear-back notification image data, in place of the talk notification image 105.

The clear-back notification image 110 shows the called communication partner's name that used to be displayed from a central part to a right part of the image in the talk notification image 105 now as the communication partner's name 96 the communication with whom has been ended.

The clear-back notification image 110 also shows alphabetical letters 97 "Incoming Call" above the name 96, telling that the communication partner made the IP telephone call this time, and alphabetical letters 111 "Ended" below the name 96, telling that the IP telephone call is ended.

Additionally, the clear-back notification image 110 shows an end display icon 112 representing the end display command for ending the display near the left edge of the image.

The control section 30 makes the region on the surface of the touch panel 16 that faces the end display icon 112 appear as command input region for inputting the end display command as long as it keeps on displaying the clear-back notification image 110 on the display screen 15A of the display section 15.

Thus, the control section 30 can have the user touch the command input region on the touch panel 16 to input the end display command while displaying the clear-back notification image 110 to the user.

Therefore, if the user inputs the end display command while the clear-back notification image 110 is being displayed to the user, the control section 30 ends the talk mode and displays back the image that it used to display before the start of the call on the display screen 15A of the display section 15, in place of the clear-back notification image 110 (and hence ending the display of the clear-back notification image 110).

The control section 30 starts counting the time elapsed by the timer arranged in the inside since it starts displaying the clear-back notification image 110 on the display screen 15A of the display section 15.

If the end display command is not input when a predetermined period of time has elapsed since the start of displaying the clear-back notification image 110, the control section 30 ends the talk mode exactly at the time when the predetermined period of time has elapsed.

As the control section 30 ends the talk mode in this way, it also ends the display of the clear-back notification image 110 on the display screen 15A of the display section 15 and displays again the image that it used to display before the start of the call on the display screen 15A.

If the command input region on the surface of the touch panel 16 that faces the talk rejection icon 101 is touched by the user to input the talk rejection command and reject the talk with the communication partner while the incoming call notification image 95 is being displayed on the display screen 15A of the display section 15 to make the user answer the IP telephone, the control section 30 generates talk rejection data for rejecting the talk with the communication partner.

Then, the control section 30 transmits the talk rejection data to the external communication apparatus that the communication partner is operating by the wireless communication section 35 by way of an access point and the Internet and subsequently cuts off the communication to make the user not to talk with the communication partner.

As the talk with the communication partner is rejected and the communication is cut off, the control section 30 displays the clear-back notification image 110 as described above by referring to FIG. 14 on the display screen 15A of the display section 15 to notify the user that the talk is rejected, in place of the incoming call notification image 95.

Thus, the control section 30 utilizes a clear-back notification image 110 that is employed when ending a talk also for the purpose of notification of rejection of a talk. After displaying the clear-back notification image 110, the control section 30 ends the talk mode as described above by referring to FIG. 14.

On the other hand, if the control section 30 takes in incoming call interruption data transmitted by the communication partner from the external communication apparatus by way of the Internet and an access point in response to a communication partner's action of inputting the incoming call interruption command while it is calling the user, it cuts off the communication with the external communication apparatus and interrupts the incoming call from the communication partner.

As the incoming call from the communication partner is interrupted, the control section 30 displays the clear-back notification image 110, which is described above by referring to FIG. 14, to notify the interruption of the call on the display screen 15A of the display section 15, in place of the incoming call notification image 95.

In this way, when an incoming call is interrupted, the control section 30 also displays the clear-back notification image 110, which is also employed to notify the end of a talk, to notify the interruption of the incoming call and ends the talk mode as in the instance described above by referring to FIG. 14.

Additionally, if the control section 30 receives and takes in the clear-back notification data transmitted from the external communication apparatus by way of the Internet and an access point in response to a communication partner's action of inputting the clear-back command before the user inputs the clear-back command while the user is talking with the communication partner, the control section 30 cuts off the communication for the talk between the own information communication terminal 10 with the external communication apparatus that the communication partner is operating to end the telephone conversation between the user and the communication partner.

As the control section 30 ends the call in response to the communication partner's action of inputting the clear-back command, it also displays the clear-back notification image 110 on the display screen 15A of the display section 15, in place of the talk notification image 105, to end the talk mode as in the instance described above by referring to FIG. 14.

(2-4) Input Control Process in Talk Mode

Now, the input control process in a talk mode will be described below. To begin with, an outgoing call notification image 80, talk notification images 85 and 105, clear-back notification images 90 and 110 and an incoming call notification image 95 are all referred to simply as on-talk display image in the following description unless they need to be discriminated.

Additionally, clear-back icons 84, 87 and 107, hold icons 88 and 108, sound collection temporary suspension icons 89 and 109, end display icons 92 and 112, a response icon 99, a mute icon 100 and a talk rejection icon 101 are all referred to simply as on-talk display icon in the following description unless they need to be discriminated.

Figure 15:
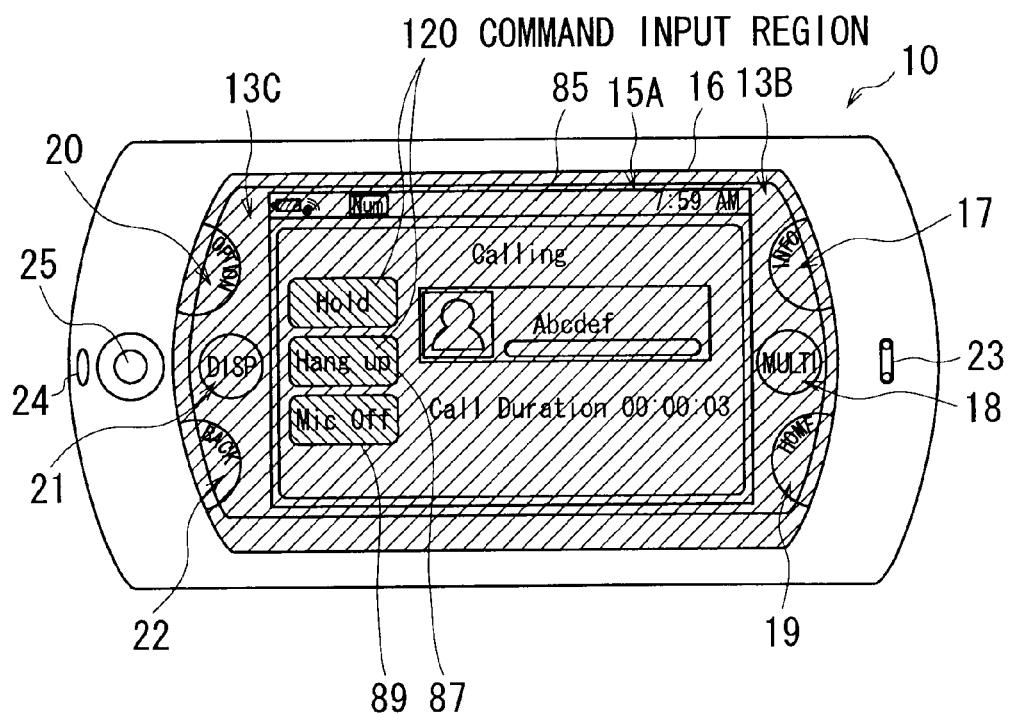
FIG. 15 is a schematic illustration of the command input region of the touch panel in a talk mode.
Figure 16:
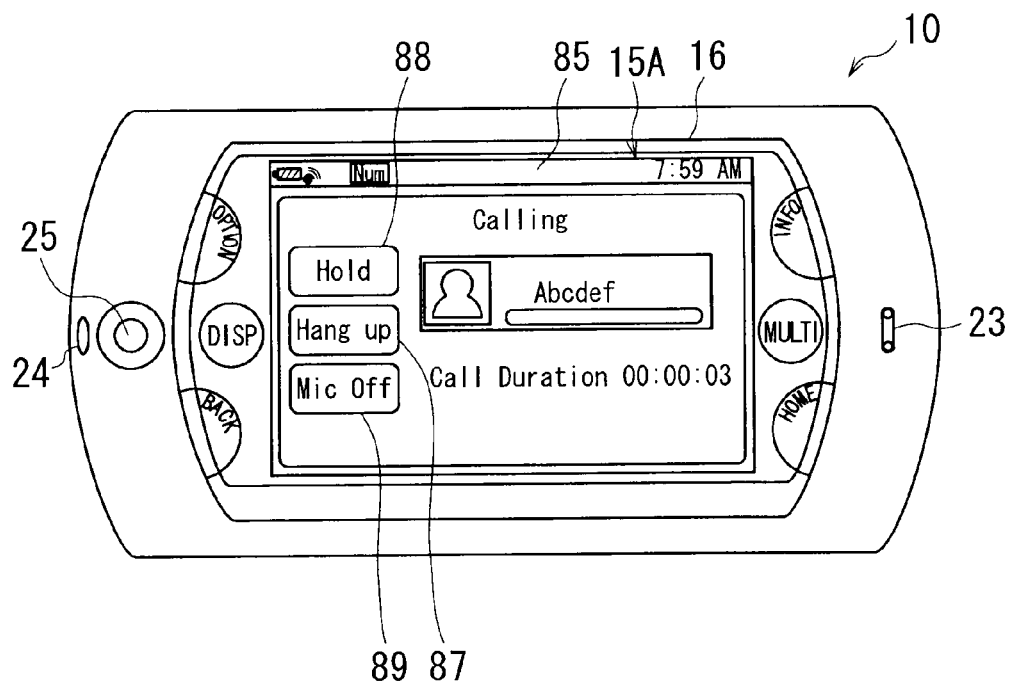
FIG. 16 is a schematic illustration of the positions of the on-talk display icons in an on-talk display image in a talk mode.
Figure 17:
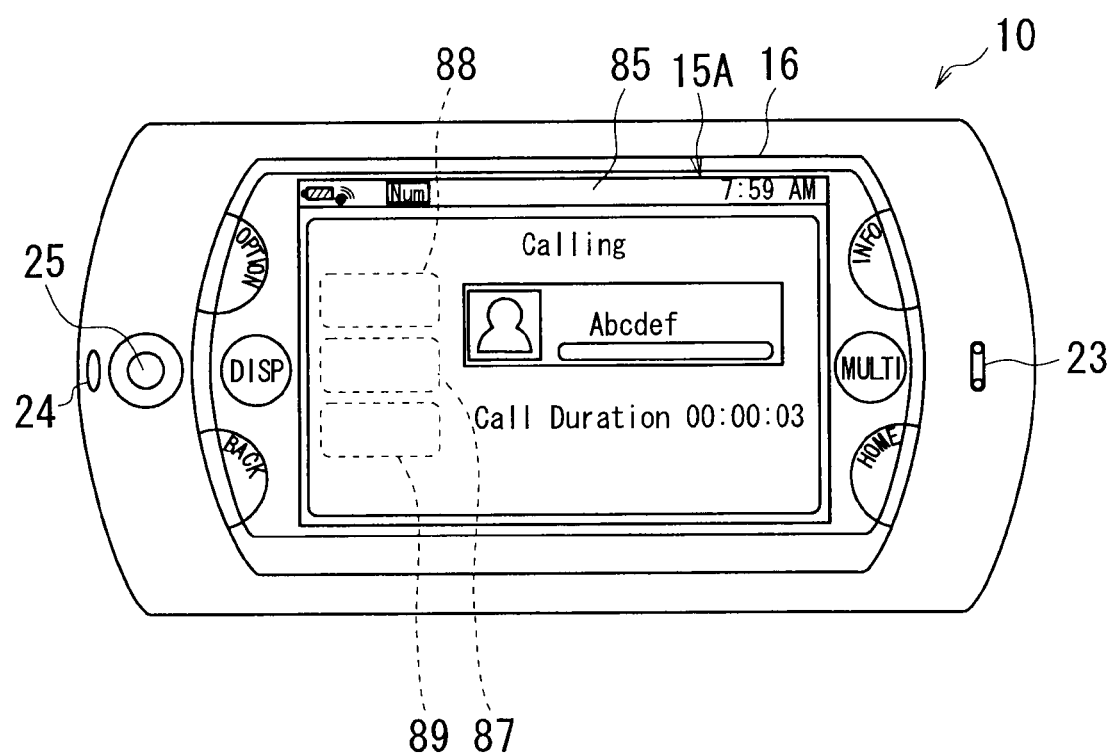
FIG. 17 is a schematic illustration of disappearance of the on-talk display icons in response to a nullified command in an on-talk mode.

Referring now to FIG. 15, as the surface of the touch panel 16 is touched in a state where an on-talk display image is being displayed on the display screen 15A of the display section 15 in a talk mode (from the time when the control section 30 shifts into a talk mode to the time when it ends the talk mode to be more accurate), the control section 30 detects the touch position but restricts the use of the covered part command determining table in the process of determining the touch position and makes the covered part command determining table unavailable.

Therefore, when the surface of the touch panel 16 is touched in a talk mode, the control section 30 determines if the touch position is in the command input region 120 facing an on-talk display icon or not by referring only to the image command determining tables but does not determine if the touch position is in any of the button-facing regions or not.

In other words, if the touch position is in one of the button-facing regions, the control section 30 simply determines that the touch position is out of the command input region 120.

Thus, the control section 30 determines the command input by a touch to the surface of the touch panel 16 only when it determines that the touch position is in the command input region 120.

With this arrangement, if the touch panel 16 is touched on the surface thereof in any of the button-facing regions facing the buttons 17 through 22 in the one edge side panel-covered part 13B and the other edge side panel-covered part 13C, the control section 30 nullifies the input of the corresponding command by the touch.

On the other hand, as long as the surface of the touch panel 16 is touched, the touch position detection data is incessantly provided from the touch panel 16 so that the control section 30 keeps on detecting the touch position and determining if the touch position is in the command input region or not as long as the surface of the touch panel 16 is held in touch.

Therefore, as the touch panel 16 is touched on the surface thereof out of the command input region 120 facing the on-talk display icons (and hence in the region other than the command input region 120 facing the on-talk display icons of the entire surface of the touch panel 16) in a talk mode, the control section 30 determines only that the touch position is out of the command input region 120. In other words, the control section 30 keeps on determining that the touch position is out of the command input region 120 so long as the touch panel 16 is continuously touched on the surface thereof.

The touch position determining condition is so defined that if the touch panel 16 is additionally touched on the surface thereof and the additional touch position is detected while the touch panel 16 is being touched on the surface thereof out of the command input region 120 and the control section 30 keeps on determining that the first touch position is out of the command input region 120 of the surface, the control section 30 compulsorily determines that the additional touch position is out of the command input region 120 regardless if the position that is actually additionally touched is in the command input region 120 or out of the command input region 120.

Note that, in the following description, the determining condition under which the control section 30 compulsorily determines that a touch position is out of the command input region 120 regardless of the actual touch position is referred to as touch position determining condition.

Under this condition, if the touch panel 16 is additionally touched and the additional touch position is detected while the touch panel 16 is being touched on the surface thereof out of the command input region 120 and the control section 30 keeps on determining that the touch position is out of the command input region 120, the control section 30 compulsorily determines that the additional touch position is out of the command input region 120 according to the touch position determining condition.

Therefore, if the touch panel 16 is additionally touched and the additional touch position is detected while the touch panel 16 is being touched on the surface thereof out of the command input region 120 and the control section 30 keeps on determining that the touch position is out of the command input region 120 in a talk mode, the control section 30 does not determine any input of a command by a touch in the command input region 120 of the surface and hence nullifies the command.

On the other hand, when the touch position determining condition is put into effect in response to a touch given to the outside of the command input region 120 on the surface of the touch panel 16 in a talk mode but then the first touch is released (and hence the touching finger tip or stylus pen is moved away from the surface of the touch panel 16) in a state where the touch panel 16 is not touched at any other area of the command input region 120 on the surface thereof, the control section 30 also puts the touch position determining condition out of effect at that instant (in other words, it does not compulsorily determine that the touch position is out of the command input region 120 regardless of the actual touch position).

However, the control section 30 does not put the touch position determining condition out of effect at the time when the first touch given to the outside of the command input region 120 is released in a state where the touch position determining condition is put into effect in response to a touch given to the outside of the command input region 120 on the surface of the touch panel 16 and the control section 30 compulsorily determines that the additional touch position is out of the command input region 120 according to the touch position determining condition in a talk mode but it puts the touch position determining condition out of effect only at the time when the additional touch is released.

With this arrangement, the control section 30 prevents it from correcting the determination it has compulsorily made that the touch position is out of the command input region 120 to allow the command to be input at the time when the first touch given to the outside of the command input region 120 is released in a state where the control section 30 puts the touch position determining condition into effect in response to a touch given to the outside of the command input region 120 on the surface of the touch panel 16 and compulsorily determines that the touch position of the additional touch is out of the command input region 120 according to the touch position determining condition although the touch position of the additional touch is in the inside of the command input region 120 in a talk mode.

In other words, if a spot outside the command input region 120 is additionally touched on the surface of the touch panel 16 in a state where another spot outside the command input region 120 is already touched, the control section 30 nullifies the command by putting the touch position determining condition into effect so as not to determine if the touch panel 16 is touched on the surface thereof in the command input region 120.

On the other hand, a clear-back icon 87, a hold icon 88 and a sound collection temporary suspension command 89 are arranged in the above-described talk notification image 85 in the transversal direction of the terminal near the left edge of the image.

Thus, the clear-back icon 87, the hold icon 88 and the sound collection temporary suspension icon 88 are arranged maximally away from the speaker 23 but maximally close to the microphone 24.

Other on-talk display icons including a clear-back icon 84, a response icon 99, a talk rejection icon 101 are arranged maximally close to the left edge in any of the above-described on-talk display images including the outgoing call notification image 80 and the incoming call notification image 95 so that consequently they are located maximally away from the speaker 23 but maximally close to the microphone 24.

Therefore, when the speaker 23 of the information communication terminal 10 is brought close to one of the user's ears while the microphone 24 thereof is brought close to the user's mouth in a talk mode, the command input region 120 that faces the on-talk icons on the surface of the touch panel 16 is prevented from directly being touched by the earlobe of the ear or the like of the user.

Additionally, since the information communication terminal 10 is made to show a relatively oblong profile in the longitudinal direction thereof, the command input region 120 that faces the on-talk icons on the surface of the touch panel 16 is maximally prevented from being touched by a cheek of the user's face if the speaker 23 is brought close to one of the ears of the user while the microphone 24 is brought close to the user's mouth in a talk mode.

Still additionally, the touch panel 16 has an arched edge at the side of the speaker 23 that is transversal relative to the longitudinal direction of the touch panel 16.

The speaker 23 is arranged near the apex of the arched edge of the touch panel 16 where the arched edge protrudes most at the terminal housing 11 in the information communication terminal 10.

Therefore, as the speaker 23 of the information communication terminal 10 is brought close to one of the ears of the user while the microphone 24 is brought close to the user's mouth in a talk mode, the one edge of the touch panel 16 is likely to be touched by a part of the user's ear (a projecting part of the auricle or the earlobe) or a part near the user's ear (a part closer to the corresponding cheek of the face than the auricle).

Thus, as the user holds the information communication terminal 10 by hand and brings it close to one of the ears in a talk mode while bringing the microphone 24 close to the mouth (and hence to the face), he or she generally pushes the area of the speaker 23 of the information communication terminal 10 against the ear to make sure that the communication partner's voice is audible and then talks with the communication partner, holding the area of the speaker 23 in a state where it is pushed against the ear.

Differently stated, as the user holds the information communication terminal 10 by hand and brings it close to the face in a talk mode, an area of the surface of the touch panel 16 near the one edge that is located outside the command input region 120 is touched by a part of one of the ears of the user (a projecting part of the auricle or the earlobe) or a facial part near the user's ear (a part closer to the corresponding cheek of the face than the auricle) and the touch is maintained.

Since the major surfaces of the terminal housing 11 of the information communication terminal 10 are formed flat, as the information communication terminal 10 is held by hand and brought close to the user's face in a talk mode, the microphone 24 is inevitably held away from mouth to some extent.

Thus, as the information communication terminal 10 is brought close to the user's face in a talk mode and an area of the surface of the touch panel 16 near the one edge is touched by a part of one of the ears of the user or a facial part near the ear, the control section 30 can incessantly determine that the touch position is out of the command input region 120 in such a state.

Then, if the information communication terminal 10 is pushed against the user's face and the command input region 120 is additionally touched in the inside thereof on the surface of the touch panel 16 while the control section 30 incessantly determines that the touch position on the surface of the touch panel 16 is out of the command input region 120 in a talk mode, the control section 30 compulsorily determines that the position touched by the cheek of the user's face is out of the command input region 120 so that the input of the command can be nullified.

Additionally, the touch panel 16 is made to show a relatively oblong profile in the longitudinal direction of the housing and the one edge protrudes toward the corresponding one edge of the terminal housing 11 as described above.

Therefore, if the user holds the information communication terminal 10 by hand so as to cover the touch panel 16 by the palm with the microphone 24 located at the index finger side, while the speaker 23 located at the little finger side of the palm, the touch panel 16 is likely to be touched by the little finger near the one edge (at the side of the speaker 23).

If the user picks up the information communication terminal 10, while holding it by hand, and the touch panel 16 is touched on the surface thereof near the one edge outside the command input region 120 by the little finger in a talk mode, the control section 30 can incessantly determine that the touch position is outside the command input region 120 so long as the touch panel 16 is touched there by the little finger.

Additionally, if the touch panel 16 is additionally touched on the surface thereof by the little finger side of the user's palm in the inside of the command input region 120 in a state where the user picks up the information communication terminal 10, while holding it by hand, and the touch panel 16 is touched on the surface thereof in a talk mode and the control section 30 incessantly determines that the touch position is out of the command input region 120, the control section 30 compulsorily determines that the additional touch position touched by the palm is outside the command input region 120 to nullify any input command.

In this embodiment, the control section 30 erases all the on-talk display icons such as a clear-back icon 87, a hold icon 88, a sound collection temporary suspension icon 89 in an on-talk display image like the on-talk display image 85 being displayed on the display screen 15A of the display section 15 as long as it nullifies any command input in response to a touch on the surface of the touch panel 16 outside the command input region 120 in a talk mode.

With this arrangement, the control section 30 can make the user recognize with ease that no command is input by error if he or she touches the surface of the touch panel 16 by means of the on-talk display image so long as any command input in response to the touch on the surface of the touch panel 16 outside the command input region 120 is nullified in a talk mode.

Therefore, the control section 30 can make the user realize that he or she can freely pick up or otherwise handle the information communication terminal 10 by hand without worrying about any operation error by means of the on-talk display image so long as it nullifies any command input in response to the touch on the surface of the touch panel 16 outside the command input region 120 in a talk mode.

Additionally, when a headset is connected to the connector jack 27, it detects that the headset is connected to it and notifies the control section 30 of the connection. Similarly, when a headset is removed from the connector jack 27, it detects the removal of the headset and notifies the control section 30 thereof.

As the control section 30 is notified of that a headset is connected to the connector jack 27 by the latter in a talk mode, it suspends the operation of the touch panel 16 from that time until it receives a notification that the headset is removed so that, if the surface of the touch panel 16 is touched while the touch panel 16 is at rest, the touch is no longer detected.

Thus, when a headset is connected to the connector jack 17 in a talk mode, the information communication terminal 10 is more likely to be put into a bag or a pocket of the clothes. However, if the information communication terminal 10 is put into a bag or a pocket of the clothes, it is prevented from falling into an operation error when the surface of the touch panel 16 is touched by a book in the bag or the cloth of the pocket.

Now, the input control process sequence RT1 that is followed by the control section 30 of the information communication terminal 10 in a talk mode will be described below by referring to the flowcharts of FIGS. 18A and 18B.

Figure 18A:
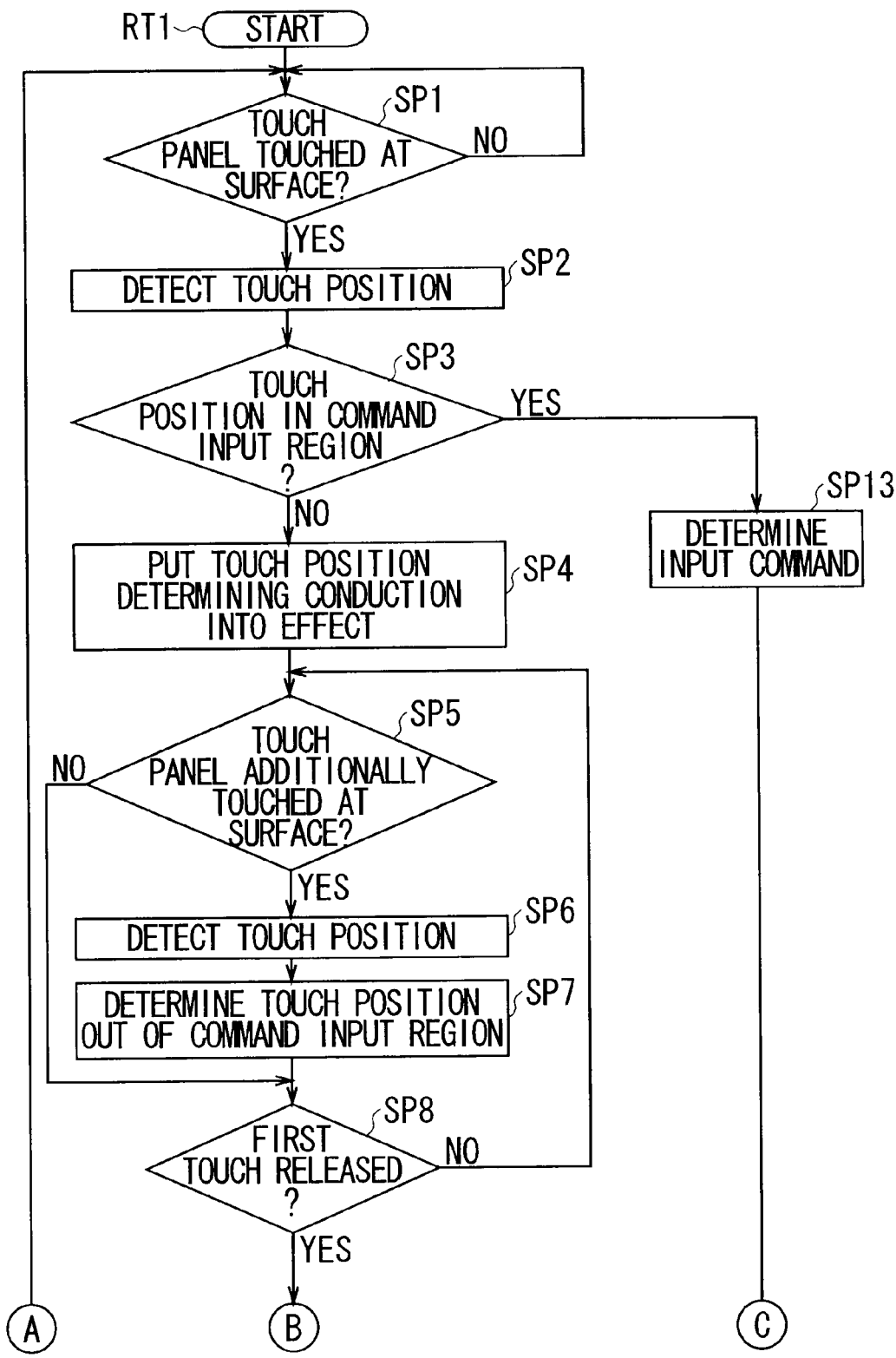
FIGS. 18A and 18B are flowcharts of the input control process sequence.
Figure 18B:
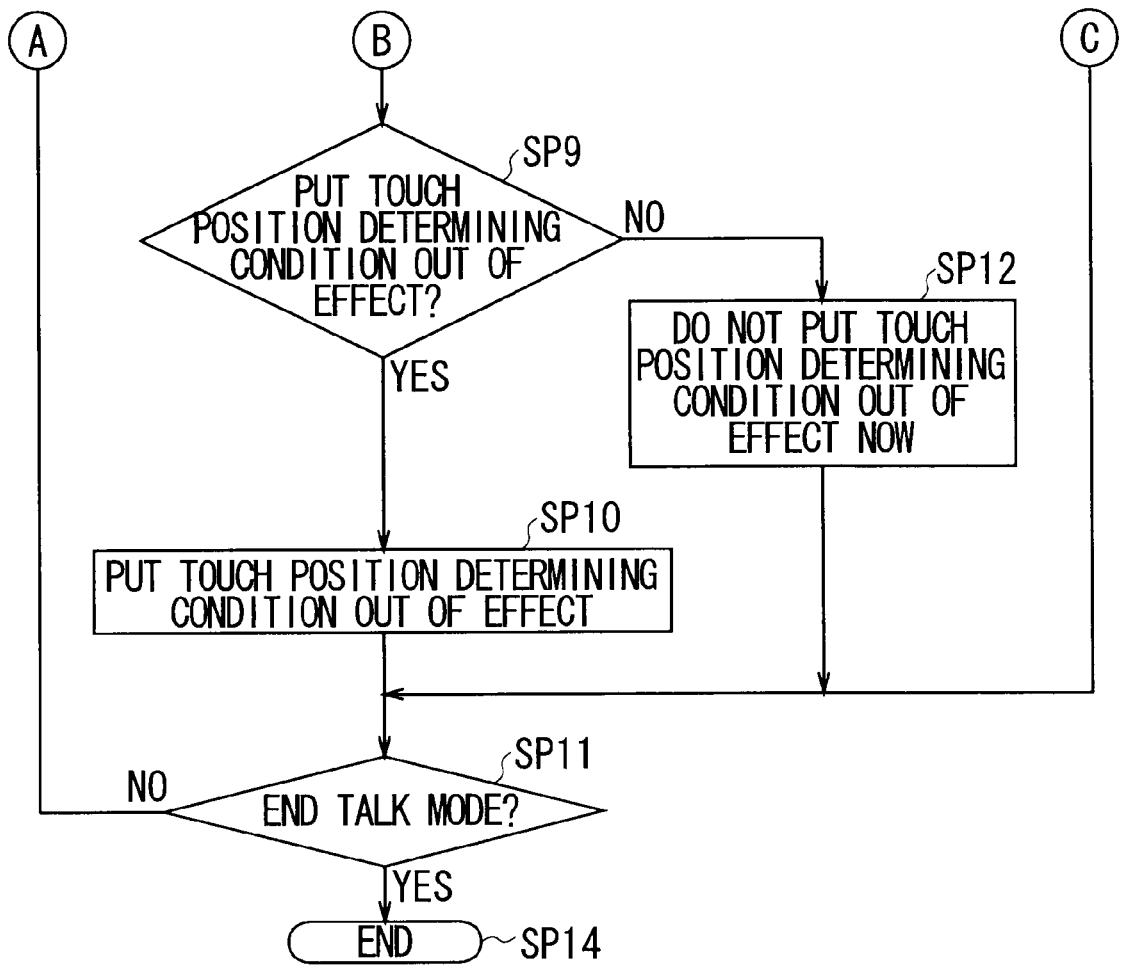

As the control section 30 shifts into a talk mode, it starts displaying an on-talk display image on the display screen 15A of the display section 15 and also starts to follow the input control process sequence RT1 shown in FIGS. 18A and 18B according to the input control program stored in the flash memory 31.

As the control section 30 starts to follow the input control process sequence RT1, it waits for a touch given to the surface of the touch panel 16 in Step SP1.

When the surface of the touch panel 16 is touched and touch position detection data is supplied from the touch panel 16, the control section 30 moves to the next step, or Step SP2.

In Step SP2, the control section 30 detects touch position on the surface of the touch panel 16 according to the touch position detection data and then moves to the next step, or Step SP3.

In Step SP3, the control section 30 determines if the touch position on the surface of the touch panel 16 is inside the command input region 120 or not by referring to the image command determining tables.

If the answer to the question in Step SP3 is negative, it means that the touch panel 16 is touched on the surface thereof somewhere outside the command input region 120 before it is touched somewhere inside the command input region 120 probably because the user's face is brought close to the information communication terminal 10 and the touch panel 16 is touched by a part of one of the ears of the user or a facial part near the ear or the information communication terminal 10 is picked up by hand and the touch panel 16 is touched by the palm.

Thus, if the answer to the question is negative in Step SP3, the control section 30 moves to the next step, or Step SP4.

In Step SP4, if the surface of the touch panel 16 is additionally touched, while it is being touched outside the command input region 120, the control section 30 puts the touch position determining condition of compulsorily determining the additional touch position to be outside the command input region 120 into effect and subsequently moves into the next step, or Step SP5.

In Step SP5, the control section 30 determines if the surface of the touch panel 16 is additionally touched or not, while it is being touched outside the command input region 120.

If the answer to the question in Step SP5 is positive, it means that the surface of the touch panel 16 is touched by a cheek of the user's face or the palm of one of the user's hand while it is being touched outside the command input region 120 by a part of one of the user's ear, a facial part near the ear or palm.

Thus, if the answer to the question is positive in Step SP5, the control section 30 moves to the next step, or Step SP6.

In Step SP6, the control section 30 detects the additional touch position on the surface of the touch panel 16 according to the touch position detection data additionally supplied from the touch panel 16 and then moves to the next step, or Step SP7.

In Step SP7, the control section 30 compulsorily determines that the touch position detected in response to the additional touch on the surface of the touch panel 16 is outside the command input region 120 to meet the requirement of the touch position determining condition and then moves to the next step, or Step SP8.

In Step SP8, the control section 30 determines if the former touch on the surface of the touch panel 16 is released or not.

If the answer to the question in Step SP8 is negative, it means that the touch panel 16 is still being continuously touched on the surface thereof outside the command input region 120. Thus, if the answer to the question in Step SP8 is negative, the control section 30 returns to Step SP5.

As the control section 30 returns to Step SP5 from Step SP8, it again determines if the surface of the touch panel 16 is additionally touched or not, while it is being touched outside the command input region 120.

If the additional touch on the surface of the touch panel 16 that is determined to have been given in Step SP5 last time is still continuing when the control section 30 returns to Step SP5 from Step SP8 and hence the answer to the question in Step SP5 is positive this time again, the control section 30 moves to the next step, or Step SP6.

If, on the other hand, the answer to the question in Step SP5 is negative, it means that the touch panel 16 keeps on being touched on the surface thereof outside the command input region 120 by a part of one of the user's ears, a facial part near the user's ear or a palm but no additional touch is given to the surface or that an additional touch is given to the surface once by a cheek of the user's face or a palm but it is already released, while the touch panel 16 keeps on being touched on the surface thereof outside the command input region 120 by a part of one of the user's ears, a facial part near the user's ear or a palm.

Thus, if the answer to the question in Step SP5 is negative, the control section 30 moves to Step SP8, by passing Step SP6 and Step SP7.

In this way, the control section 30 cyclically repeats the processing operations of Step SP5 through Step SP8 until it receives a positive answer in Step SP8.

If the answer to the question in Step SP8 is positive, it means that the touch given to the surface of the touch panel 16 outside the command input region 120 by a part of one of the user's ears, a facial part near the user's ear or a palm is released (and hence that part is moved away).

Thus, if the answer to the question in Step SP8 is positive, the control section 30 moves to the next step, or Step SP9.

In Step SP9, the control section 30 determines if the touch position determining condition that is put into effect in Step SP4 has to be put out of effect or not.

If the answer to the question in Step SP9 is positive, it means that the first touch given to the outside of the command input region 120 is released in a state where the additional touch given to the surface of the touch panel 16 has already been released.

Thus, if the answer to the question in Step SP9 is positive, the control section 30 moves to the next step, or Step SP10.

In Step SP10, the control section 30 puts the touch position determining condition that has been put into effect in Step SP4 out of effect and moves to the next step, or Step SP11.

If, on the other hand, the answer to the question in Step SP9 is negative, it means that the first touch given to the outside of the command input region 120 is released while the additional touch given to the surface of the touch panel 16 is continuing.

Thus, if the answer to the question in Step SP9 is negative, the control section 30 moves to the next step, or Step SP12.

In Step SP12, the control section 30 extends the effective period of the touch position determining condition to the time when the additional touch given to the surface of the touch panel 16 is released and then moves back to Step SP11.

In Step SP11, the control section 30 determines if the talk mode has to be ended or not. If the answer to the question in Step SP11 is negative, it means that the user is still talking with the communication partner.

Thus, if the answer to the question in Step SP11 is negative, the control section 30 returns to Step SP1.

If the control section 30 returns to Step SP1 after sequentially executing the processing operations of Step SP9 and Step SP10, it means that the surface of the touch panel 16 is not touched at all. Therefore, under this condition, the control section 30 waits for a touch given anew to the surface of the touch panel 16 in Step SP1 and, when a touch is given, it sequentially executes the processing operations subsequent to Step SP2.

If, on the other hand, the control section 30 returns to Step SP1 after sequentially executing the processing operations of Step SP9 and Step SP12, it means that the surface of the touch panel 16 is touched at a single spot (and hence the additional touch detected in Step SP5 is still there). Therefore, under this condition, the control section 30 waits for an additional touch given to the surface of the touch panel 16 in Step SP1.

If the additional touch detected in Step SP5 is released before an additional touch is given to the surface of the touch panel 16 in Step SP1, the control section 30 puts the touch position determining condition out of effect accordingly.

Then, the control section 30 waits for a touch given anew to the surface of the touch panel 16 in Step SP1 in a state where the surface of the touch panel 16 is not touched at all and, when a touch is given, it sequentially executes the processing operations subsequent to Step SP2.

If, on the other hand, another additional touch is given to the surface of the touch panel 16 in a state where the additional touch detected on the surface of the touch panel 16 in Step SP5 is not released and touch position detection data is supplied in response to the another additional touch given to the surface of the touch panel 16, the control section 30 moves to the next step, or Step SP2.

Then, in Step SP2, the control section 30 detects the touch position of the another additional touch on the surface of the touch panel 16 according to the touch position detection data and moves to the next step, or Step SP3.

Meanwhile, if the additional touch detected on the surface of the touch panel 16 in Step SP5 is released during the period from the time when the processing operation of Step SP2 is started to the time when the processing operation of Step SP3 is started, the control section 30 puts the touch position determining condition out of effect accordingly and then executes the processing operation of Step SP3 by referring to the image command determining tables as described above.

However, if the additional touch detected on the surface of the touch panel 16 in Step SP5 is not released at the time when the control section 30 starts executing the processing operation of Step SP3, the touch position determining condition is still in effect. Therefore, the control section 30 compulsorily determines that the detected touch position of the additional touch is out of the command input region 120 according to the touch position determining condition.

Then, the answer to the question in Step SP3 is inevitably negative because of the compulsory determination. Thus, the control section 30 moves to the next step, or Step SP4.

In Step SP4, the control section 30 makes the touch position determining condition remain effective regardless of the additional touch detected before in Step SP5 before it moves to Step SP5. In this way, the control section 30 executes the processing operations from Step SP5 in a manner as described above.

When the answer to the question in Step SP3 is positive, it means that the user touches the surface of the touch panel 16 only in the inside of the command input region 120 while the control section 30 is waiting for a touch in a state where the surface of the touch panel 16 is not touched at all in Step SP1 and hence the user intentionally touches only the inside of the command input region 120 in order to input a command.

Thus, if the answer to the question in Step SP3 is positive, the control section 30 moves to Step SP13.

In Step SP13, the control section 30 determines the command input by the user, referring to the command input region 120 that includes the touch position and then moves to Step SP11.

In this way, the control section 30 can reliably avoid any operation error of erroneously inputting a command that the user does not want when the user's face is brought close to the information communication terminal 10 or the information communication terminal 10 is held by one of the user's hands but accurately input a desired command through the touch panel 16 when the user's face is moved away from the information communication terminal 10 and the user's palm is moved away from the surface of the touch panel 16 to input the command by repeatedly executing the processing operations from Step SP1 through Step SP13 in a talk mode.

When the answer to the question in Step SP11 is positive, it means that the talk between the user and the communication partner has ended so that the talk mode needs to be ended. Therefore, as the control section 30 receives a positive answer in Step SP11, it moves to Step SP14, where it ends the input control process sequence RT1.

(2-5) Operations and Effects of the Embodiment

With the above-described arrangement, the information communication terminal 10 displays an on-talk display image showing on-talk display icons on the display screen 15A of the display section 15 in a talk mode.

Once the touch panel 16 arranged to cover the display screen 15A of the display section 15 is touched on the surface thereof outside the command input region 120 (Step SP1 through Step SP3) in a talk mode, the information communication terminal 10 nullifies the command input by a touch given to the inside of the command input region 120 as long as the touch given to the touch panel 16 outside the command input region 120 continues (Step SP4 through Step SP8).

However, when the touch panel 16 is touched on the surface thereof only in the inside of the command input region 120 while the touch panel 16 is not touched at all on the surface thereof outside the command input region 120 in a talk mode, the information communication terminal 10 allows the corresponding command to be input in response to the touch (Step SP13).

Therefore, when the information communication terminal 10 is held by hand and brought close to the user's face in a talk mode, it does not do any particular operation of nullifying the command input in response to a touch given to the touch panel 16. However, when the information communication terminal 10 is held by hand and the surface of the touch panel 16 is covered by a palm to answer an incoming call or the surface of the touch panel 16 is brought close to the user's face for a telephone conversation and the touch panel 16 is touched by the palm or a facial part near one of the user's ears in a talk mode, the information communication terminal 10 avoids any input of a command that the user does not want if the touch panel 16 is touched by a palm or a cheek of the user's face in the inside of the command input region 120.

Thus, with the above-described arrangement, when the touch panel 16 is additionally touched on the surface thereof in the inside of the command input regions 120 while it is being touched outside the command input region 120 in a talk mode, the input of the command due to the touch in the inside of the command input region 120 is nullified.

Therefore, when the touch panel 16 of the information communication terminal 10 is being touched outside the command input region 120 by a palm or a facial part near one of the user's ears in a talk mode, the information communication terminal 10 can avoid a situation where a command that the user does not want is input if the touch panel 16 is additionally touched in the inside of the command input region 120 by a palm or a cheek of the user's face. Thus, the information communication terminal 10 can avoid any operation error in a talk mode.

A speaker 23 is arranged outside and near the one edge transversal relative to the longitudinal direction of the touch panel 16 and a microphone 24 is arranged also outside and near the other edge transversal relative to the longitudinal direction of the touch panel 16 in such a way that the on-talk display icons in the on-talk display image being displayed on the display screen 15A of the display section 15 in a talk mode is maximally away from the speaker 23 but maximally close to the microphone 24.

Therefore, when the speaker 23 of the information communication terminal 10 is brought close to one of the user's ears while the microphone 24 thereof is brought close to the user's mouth in a talk mode, a facial part near one of the user's ears can be made to continuously touch the touch panel 16 on the surface thereof outside the command input region 120 but a cheek of the user's face can hardly touch the touch panel 16 on the surface thereof in the inside of the command input region 120.

Thus, while the user can touch the touch panel 16 on the surface thereof in the inside of the command input region 120 whenever he or she wants to input a command in a talk mode, the user is required neither to care about avoiding any operation error when he or she brings the information communication terminal 10 close to the face for a telephone conversation nor to operate for nullifying any input of a command. In other words, once the user brings his or her face close to the information communication terminal 10 and touches the touch panel 16 continuously on the surface thereof outside the command input region 120 by a facial part near one of the user's ears or the like, no command is input due to the continuous touch if the touch panel 16 is additionally touched on the surface thereof by a cheek of the user's face.

Additionally, the touch panel 16 has an arched edge at the side of the speaker that is transversal relative to the longitudinal direction of the touch panel 16 and the speaker 23 is arranged near the apex of the arched edge of the touch panel 16 where the arched edge protrudes most in the information communication terminal 10.

Therefore, when the information communication terminal 10 is brought close to the user's face in a talk mode, the user can reliably touch the touch panel 16 on the surface thereof outside the command input region 120 at the side of the speaker 23 by means of a facial part near one of the user's ears.

Still additionally, the terminal housing 11 of the information communication terminal 10 is made to show a relatively oblong profile in the longitudinal direction thereof and the one edge of the touch panel 16 that is transversal relative to the longitudinal direction of the panel is made to protrude toward the one edge of the terminal housing 11.

Therefore, when the information communication terminal 10 is picked up by the user in such a way that the touch panel 16 is covered by a palm, the one edge of the touch panel 16 (at the side of the speaker 23) can be touched with ease by means of the corresponding little finger.

Thus, when the information communication terminal 10 is held by hand and picked up by the user in a talk mode, there arises a state where the touch panel 16 is touched on the surface thereof outside the command input region 120 by part of the palm of the user so that consequently any command input subsequently by an additional touch given to the inside of the command input region 120 can be nullified.

Furthermore, a touch position determining condition is defined for the information communication terminal 10 in such a way that, if while the touch panel 16 is held in touch on the surface thereof outside the command input region 120 in a talk mode, the position of the additional touch is compulsorily determined to be outside the command input region 120 regardless of the actual touch position of the additional touch.

Therefore, if the touch panel 16 of the information communication terminal 10 is additionally touched on the surface thereof in the inside of the command input region 120 while the touch panel 16 is held in touch on the surface thereof at a spot outside the command input region 120 in a talk mode, the information communication terminal 10 does not determine the input of the command by the additional touch on the surface in the inside of the command input region 120 and hence the input of the command can be reliably nullified.

Still additionally, when the first touch given to the outside of the command input region 120 is released in a state where a touch position determining condition is defined for the information communication terminal 10 in response to a touch given to the surface of the touch panel 16 outside the command input region 120 and the position of an additional touch is compulsorily determined to be outside the command input region 120 according to the touch position determining condition in a talk mode, the information communication terminal 10 does not put the touch position determining condition out of effect when the first touch given to the touch panel 16 outside the command input region 120 is released but it puts the touch position determining condition out of effect when the additional touch is released.

Therefore, if the first touch is released in a state where a touch position determining condition is defined for the information communication terminal 10 in response to a touch given to the surface of the touch panel 16 outside the command input region 120 and the position of an additional touch is compulsorily determined to be outside the command input region 120 according to the touch position determining condition so that the position of an additional touch is compulsorily determined to be outside the command input region 120 according to the touch position determining condition regardless if the touch position of the additional touch is in the inside of the command input region 120 in a talk mode, the information communication terminal 10 can reliably prevent itself from determining anew that the touch position that is compulsorily determined to be outside the command input region 120 first is now in the inside of the command input region 120 so as to allow the command to be input.

(3) Other Embodiments

While on-talk display icons are arranged in an on-talk display image that is displayed in a talk mode in the above-described embodiment, the present invention is by no means limited thereto and it may alternatively be so arranged that on-talk display icons are drawn in the other edge side panel-covered part 13C of the terminal housing 11 as so many buttons and a command input region is defined as a region of the surface of the touch panel 16 facing the buttons and that any input of command is nullified so long as the touch panel 16 is being touched on the surface thereof outside the command input region 120 in a talk mode if the touch panel 16 is additionally touched on the surface thereof in the inside of the command input region 120.

With such an arrangement, the command input region is located closer to the microphone 24 on the surface of the touch panel 16 than in the above-described embodiment so that it may hardly be touched by a cheek of the user's face.

Figure 19:
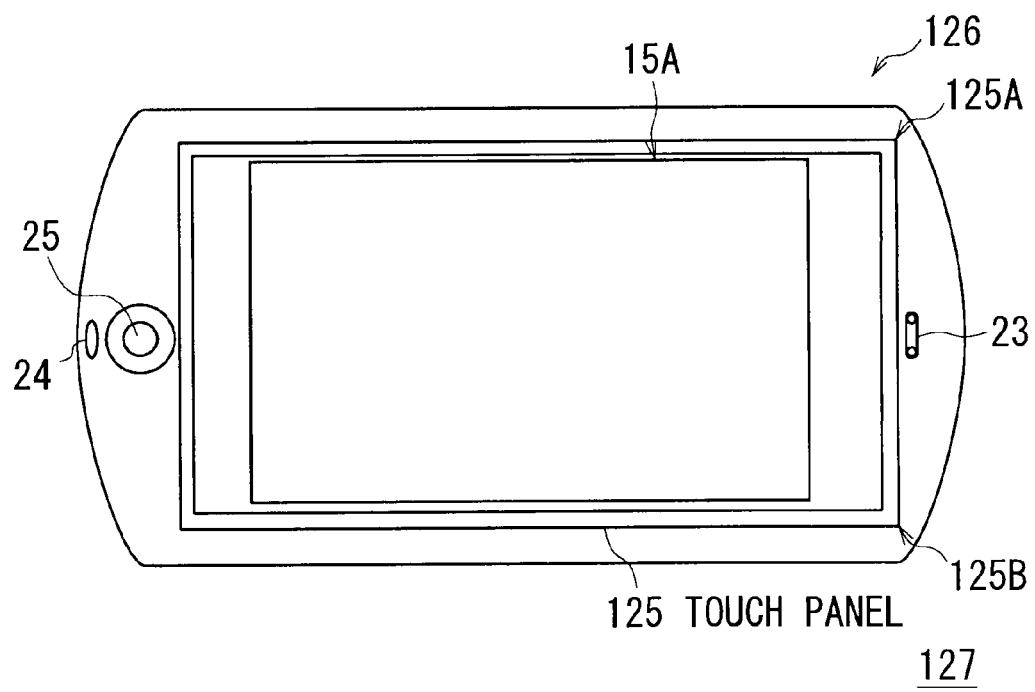
FIG. 19 is a schematic illustration of the configuration of the touch panel of another embodiment.

While the touch panel 16 is made to show a race-track-like profile in the above-described embodiment, the present invention is by no means limited thereto and it may alternatively be made to show a rectangular profile like the touch panel 25 shown in FIG. 19.

With the arrangement of FIG. 19, the corners 125A and 125B at the one edge side of the touch panel 125 are located close to the corresponding lateral surfaces of the terminal housing 126 and the surface of the touch panel 125 can easily be touched at the one edge side thereof by the earlobe or some other external part of one of the user's ears when the information communication terminal 127 is brought close to the user's face in a talk mode.

Additionally, with such an arrangement, when the user holds the information communication terminal 127 by hand and picks it up, he or she can touch the surface of the touch panel 125 at or near the one edge thereof by a base of the little finger with ease in a talk mode.

While the control section 30 of the above-described embodiment puts the touch position determining condition into effect and nullifies any input of command so long as the touch panel 16 is touched on the surface thereof outside the command input region 120 in a talk mode in the above-described embodiment, the present invention is by no means limited thereto and it may alternatively be so arranged that, if the touch panel 16 is additionally touched on the surface thereof while the surface of the touch panel 16 is held in touch and touch position detection data is supplied to the control section 30 from the touch panel 16 in a talk mode, the control section 30 does not detect the touch position of the additional touch according to the touch position detection data. The net effect of such an arrangement is same as that of the above-described embodiment.

While the control section 30 of the above-described embodiment puts the touch position determining condition into effect as long as the touch panel 16 is held in touch on the surface thereof outside the command input region 120 in a talk mode so that, if the touch panel 16 is additionally touched on the surface thereof in the inside of the command input region 120, it determines the touch position of the additional touch to be outside the command input region 120, the present invention is by no means limited thereto and it may alternatively be so arranged that the control section 30 does not put the touch position determining condition into effect if the touch panel 16 is held in touch on the surface thereof outside the command input region 120 in a talk mode and, if the touch panel 16 is additionally touched on the surface thereof in the inside of the command input region 120, it determines that the touch position is in the inside of the command input region 120 but does not determine the command input in response to the additional touch or, if it determines the input command, it does not execute the process corresponding to the determined command. The net effect of such an arrangement is same as that of the above-described embodiment.

Figure 20:
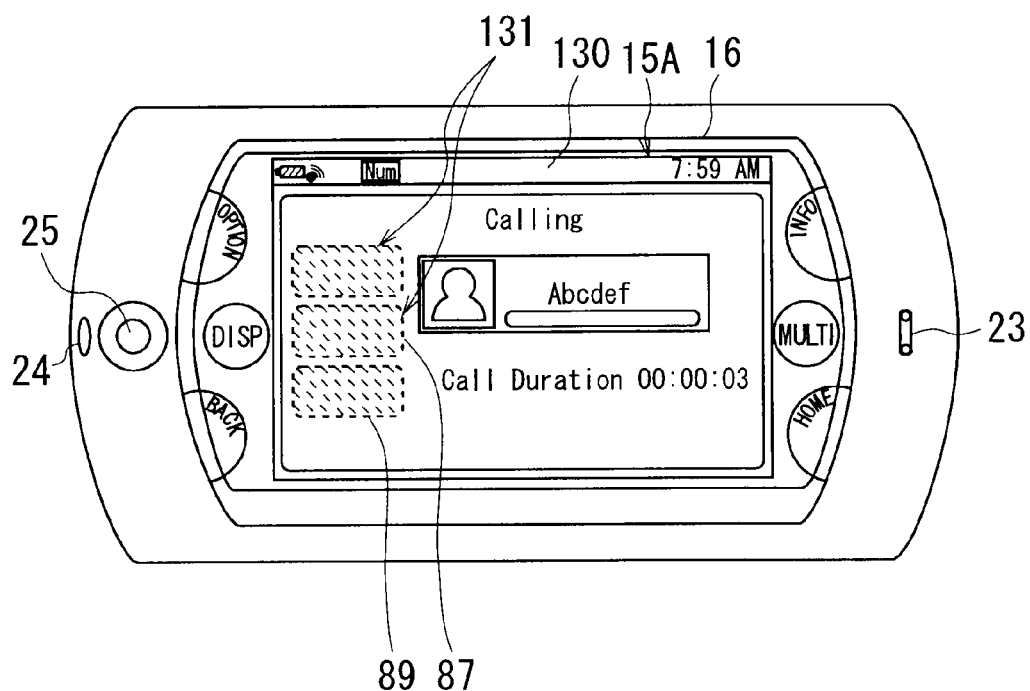
FIG. 20 is a schematic illustration of the change in the display status of the on-talk display icons in response to a nullified cache memory in an on-talk mode of another embodiment.
Figure 21:
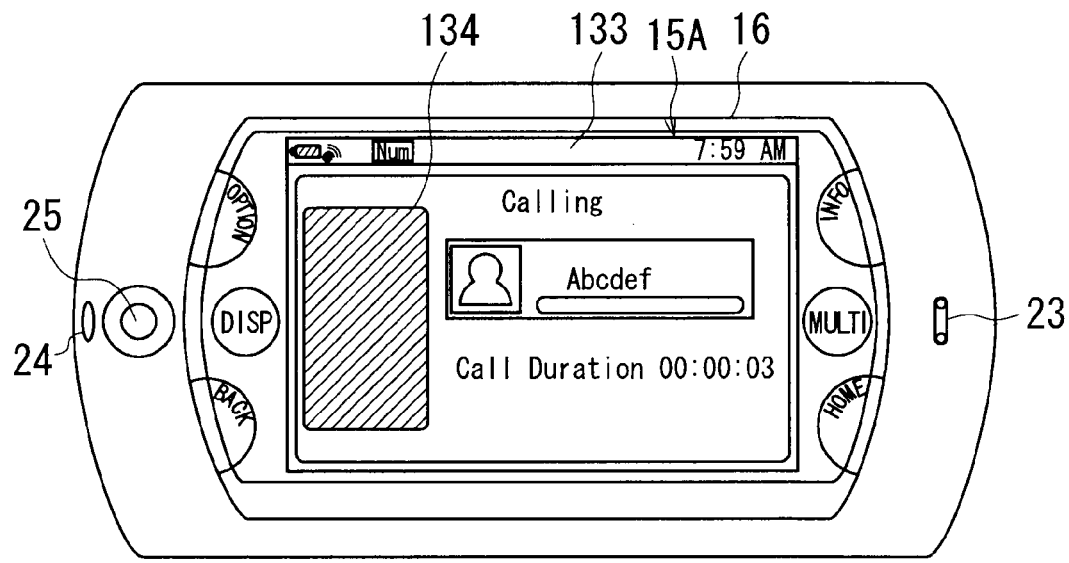
FIG. 21 is a schematic illustration of the change in the display status of the on-talk display icons in response to a nullified cache memory in an on-talk mode of still another embodiment.

While the control section 30 of the above-described embodiment erases the on-talk display icons in the on-talk display image as long as the touch panel 16 is held in touch on the surface thereof outside the command input region 120 in a talk mode. The present invention is by no means limited thereto and it may alternatively be so arranged that the control section 30 lowers the level of luminance and lightness of the on-talk display icons 131 in the on-talk display image 130 from the ordinary level so as to make them appear different from ordinary on-talk display icons as shown in FIG. 20 or the arrangement region 134 for arranging on-talk display icons in the on-talk display image 133 is made to appear as solid black region that is different from the background so as to make it appear different from the background as shown in FIG. 21 as long as the touch panel 16 is held in touch on the surface thereof outside the command input region 120 in a talk mode.

While a clear-back icon 87, a hold icon 88 and a sound collection temporary suspension icon 89 are arranged in the on-talk notification image 85 in the above-described embodiment, the present invention is by no means limited thereto and it may alternatively be so arranged that at least one of the clear-back icon 87, the hold icon 88 and the sound collection temporary suspension icon 89 is arranged in the on-talk notification image 85 or a plurality of on-talk display icons including a clear-back icon 87, a hold icon 88 and a sound collection temporary suspension icon 89 are arranged in the on-talk notification image 85.

Such an arrangement can equally be applied to any of the other on-talk display images including the outgoing call notification image 80, the incoming call notification image 95 and the talk notification image 105 where a plurality of on-talk display icons are arranged.

Figure 22:
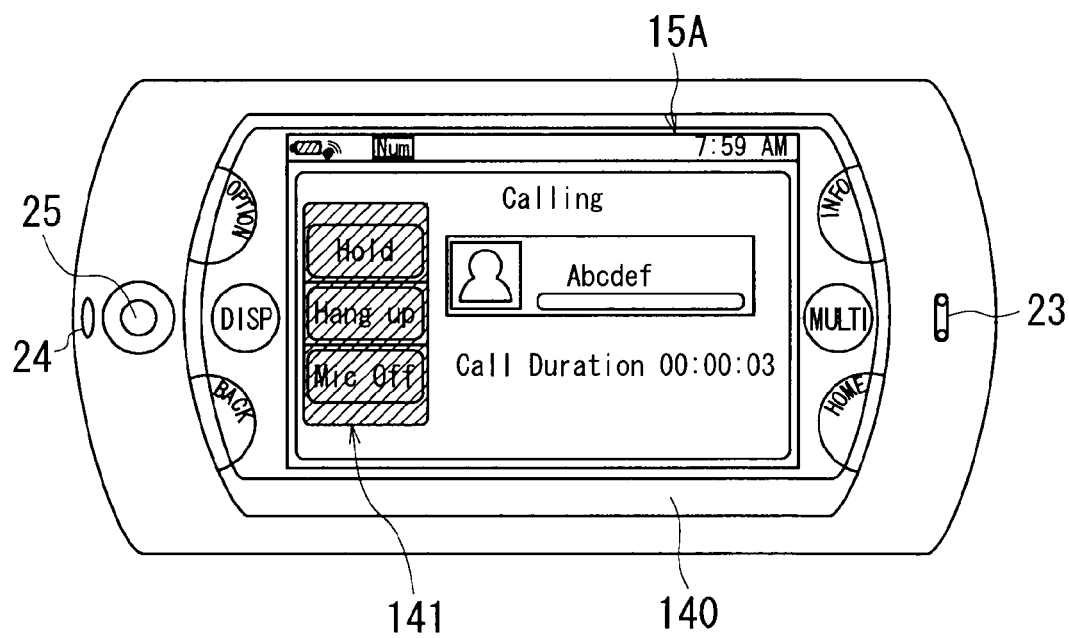
FIG. 22 is a schematic illustration of the command input region of still another embodiment, showing the configuration thereof.

While the command input region 120 on the surface of the touch panel 16 is made to have a shape and a size same as an on-talk display icon in the above-described embodiment, the present invention is by no means limited thereto and the command input region 141 on the surface of the touch panel 140 may alternatively be made larger than an on-talk display icon as shown in FIG. 22.

With such an arrangement, any command can be reliably input if the touch panel 16 is touched by means of a relatively large object such as a finger because the command input region 141 is large.

While the touch panel 16 is touched on the surface thereof at a spot in the command input region 120 in a talk mode to input a command in the above-described embodiment, the present invention is by no means limited thereto and it may alternatively be so arranged that a command is input by touching the touch panel 16 on the surface thereof in the inside of the command input region 120 by means of a finger tip and shifting the touch position in the longitudinal direction or in the transversal direction of the touch panel, keeping the finger tip in touch with the surface, (and hence moving the finger tip so as to rub the surface of the touch panel 16).

With such an arrangement, the operation of inputting a command by means of the touch panel 16 is not a simple touch given to the inside of the command input region 120 but an operation of shifting the touch position, keeping the finger tip or the like in touch with the surface of the touch panel 16. Therefore, a command is hardly input by error as a cheek of the user's face or a palm unintentionally touches the inside of the command input region 120 when the information communication terminal 10 is brought close to the user's face or held by a palm and picked up.

Additionally, with such an arrangement, it is possible to substantially reliably nullify the input of a command that can take place as a cheek of the user's face or a palm unintentionally touches the inside of the command input region 120 when the information communication terminal 10 is brought close to the user's face or held by a palm and picked up if it is additionally so arranged that the information communication terminal 10 does not accept any operation of touching the inside of the command input region 120 and shifting the touch position (in other words, does not detect any shift of a touch position or does not determine an input of command if a shifting touch position is detected) so long as the touch panel 16 is held in touch on the surface thereof in the inside of the command input region 120 in a talk mode.

With such an arrangement, if at least one of the plurality of on-talk display icons 151 and 152, or the on-talk display icon

Figure 23A:
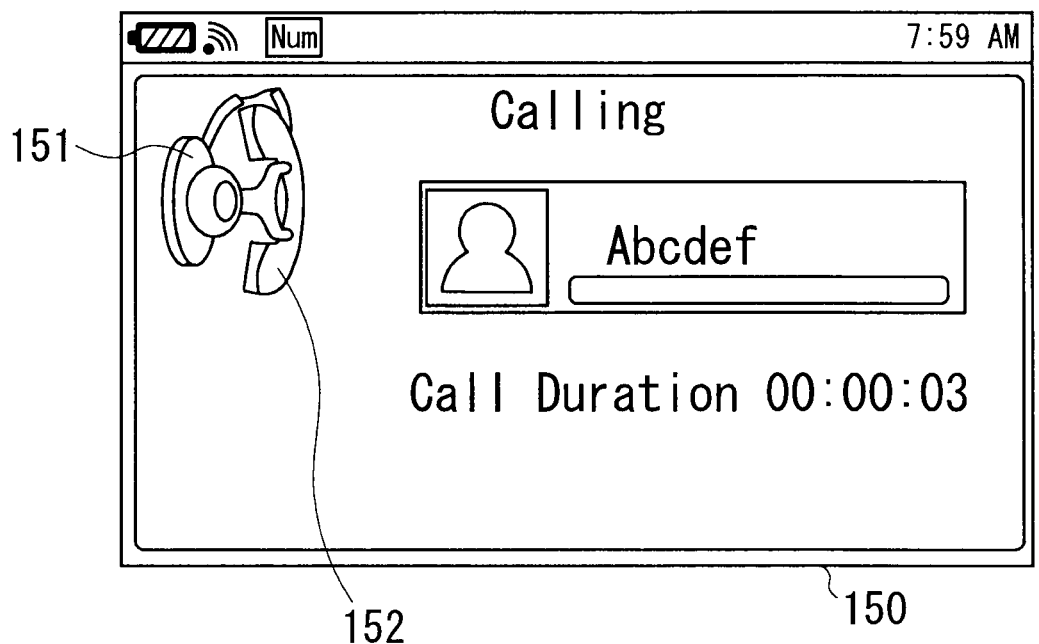
FIG. 23 is a schematic illustration of the configuration of the on-talk display icons of still another embodiment.
Figure 23B:
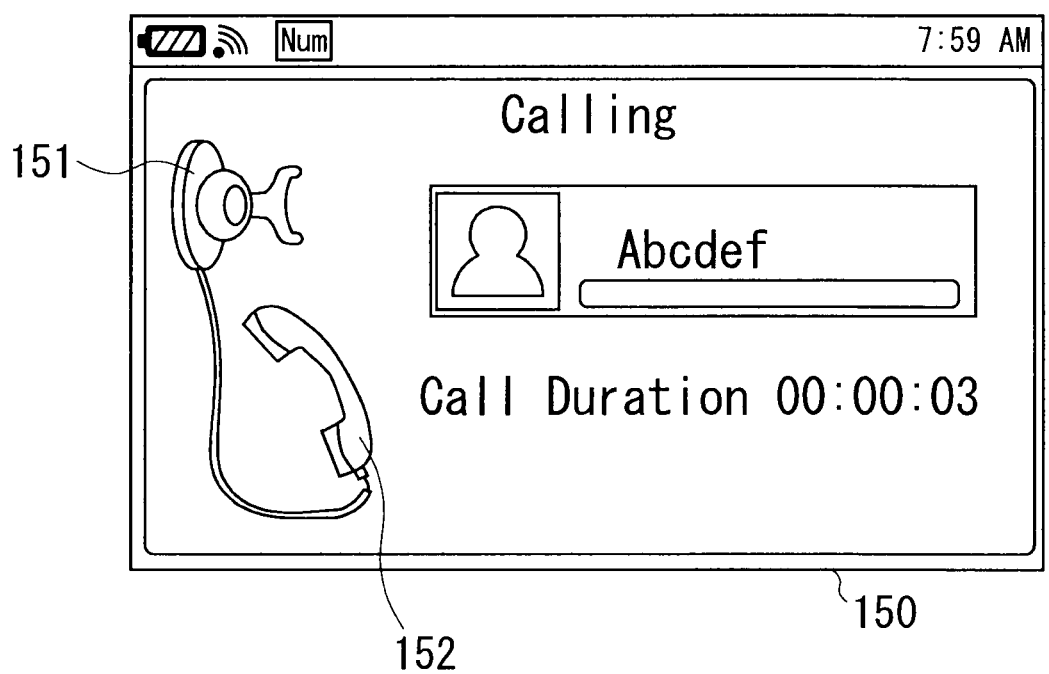

151 to be more specific, is arranged at a fixed position and the other on-talk display icon 152 is arranged so as to be movable in response to an operation of touching the command input region of the touch panel 16 and shifting the touch position, maintaining the touch (in other words, arranged such that its positional condition is changeable) in the on-talk display image 150 that is displayed on the display screen 15A of the display section 15 in a talk mode as shown in FIGS. 23A and 23B, the user can accurately make sure that the command he or she wants is reliably input in response to his or her operation of shifting the touch position, maintaining the touch in the command input region.

A communication apparatus according to the present invention is applied to the first communication apparatus 1, the second communication apparatus 5 and the information communication terminals 10 and 127 in the description given above by referring to FIGS. 1 through 23, the present invention is by no means limited thereto and the present invention can be applied to communication apparatus having various different configurations including portable telephones, portable information processing apparatus having communication features such as personal digital assistants (PDA) and transceivers.

While an input control program according to the present invention is stored in the flash memory 31 of the information communication terminal 10 of this embodiment described above by referring to FIGS. 1 through 23 and the control section 30 of the information communication terminal 10 follows the input control processing sequence RT1 described above by referring to FIG. 17 according to the input control program, the present invention is by no means limited thereto and it may alternatively be so arranged that the information communication terminal 10 installs the input control program by means of a recording medium that records the input control program and is readable relative to the information processing apparatus and the control section 30 follows the input control processing sequence RT1 described above by referring to FIG. 17 according to the installed input control program.

Still alternatively, it may be so arranged that the information communication terminal 10 installs the input control program from the outside by means of one or more than one wired or wireless communication mediums such as a local area network, the Internet and/or a digital broadcasting satellite.

The recording medium that is readable relative to the information processing apparatus and employed for installing the input control program into the information communication terminal 10 in an executable state may be a package medium such as a flexible disk.

Alternatively, the recording medium that is readable relative to the information processing apparatus and employed for installing the input control program into the information communication terminal 10 in an executable state may be a package medium such as a compact disk-read only memory (CD-ROM).

Still alternatively, the recording medium that is readable relative to the information processing apparatus and employed for installing the input control program into the information communication terminal 10 in an executable state may be a package medium such as a digital versatile disk (DVD).

The recording medium that is readable relative to the information processing apparatus may be a semiconductor memory or a magnetic disk that can temporarily or permanently store various programs as well as a package medium.

One or more than one wired or wireless communication mediums such as a local area network, the Internet and/or a digital broadcasting satellite may be used as means for recording the input control program on a recording medium that is readable relative to the information processing apparatus.

Means that can be used for recording the input control program on a recording medium which is readable relative to the information processing apparatus further include various communication interfaces such as routers and modems.

While the touch panel 2 of the above-described first communication apparatus 1 described above by referring to FIG. 1 is applied to operate as a touch panel having a surface that is oblong and shorter in one direction than in another direction orthogonal relative to the one direction and employed for inputting commands and is adapted such that, when the surface thereof is touched at a spot, it outputs touch position detection data for detecting the touch position of the spot and, when the surface is touched at another spot while the surface is being touched at the first spot, it does not output any touch position detection data for detecting the another spot, the present invention is by no means limited thereto and any of various touch panels of other types adapted to detect only a single touch position may alternatively be applied for the purpose of the present invention. Such touch panels include resistor film type touch panels, electrostatic capacity type touch panels, pressure sensitive sensor type touch panels, pressure sensor type touch panels and matrix switch type touch panels.

Assume here, for example, a resistor film type touch panel is employed to detect a single touch position for the purpose of the present invention. When the touch panel is touched on the surface thereof out of the command input region and subsequently touched additionally while the first touch is held there in a talk mode, it does not output any touch position detection data for the additional touch. Therefore, the control section does not need to execute any process for nullifying the command input in the talk mode so that the process load of control section can be remarkably reduced.

While the touch panel has a surface that is oblong and shorter in one direction than in another direction orthogonal relative to the one direction and employed for inputting commands and is adapted such that, when the surface thereof is touched at a spot, it outputs touch position detection data for detecting the touch position of the spot and, when the surface is touched at another spot while the surface is being touched at the first spot, it does not output any touch position detection data for detecting the another spot, the rectangular command input region 2A or 120 of the touch panel 2 or 16 described above by referring to FIGS. 1 through 23 being applied to operate as at least part of the command input region arranged near the other edge in the another direction in the above-described embodiment, the present invention is by no means limited thereto and each on-talk display icon may alternatively be made to show a circular, elliptic or square profile instead of the above-described rectangular profile and the command input region can be made to show a circular, elliptic or square profile, whichever appropriate, so as to match the profile of the on-talk display icon. In this way, the command input region can be made to show a profile selected from various conceivable and feasible profiles.

While the touch panel 6 of the second communication apparatus 5 described above by referring to FIGS. 2 through 23 or the electrostatic capacity type touch panel 16 for detecting two touch positions is applied to operate as a touch panel having a part of the surface thereof operating as command input region to be used for inputting a command when touched in the insider of the command input region and adapted such that, when it is touched at least at two spots on the surface thereof, it outputs respective touch position detection data for detecting the two touch positions in the above-described embodiment, the present invention is by no means limited thereto and any of various touch panels of other types adapted to detect two touch positions may alternatively be applied for the purpose of the present invention. Such touch panels include resistor film type touch panels, electrostatic capacity type touch panels, pressure sensitive sensor type touch panels, pressure sensor type touch panels and matrix switch type touch panels.

While the rectangular command input region 120 of the touch panel 16 described above by referring to FIGS. 2 through 23 is applied to operate as a command input region of a part of the surface of a touch panel adapted such that, when it is touched at least at two spots on the surface thereof, it outputs respective touch position detection data for detecting the two touch positions in the above-described embodiment, the present invention is by no means limited thereto and each on-talk display icon may alternatively be made to show a circular, elliptic or square profile instead of the above-described rectangular profile and the command input region may alternatively be made to show a circular, elliptic or square profile, whichever appropriate, so as to match the profile of the on-talk display icon. In this way, the command input region can be made to show a profile selected from various conceivable and feasible profiles.

While the command nullifying section 7 of the second communication apparatus 5 or the control section 30 of the information communication terminal 10 described above by referring to FIGS. 2 through 23 is applied to operate as a command nullifying section adapted such that, when the touch panel is touched on the surface thereof in the inside of the command input region while it is held in touch outside the command input region in a talk mode, it nullifies any input of command due to a touch in the inside of the command input region that is given while the touch panel is held in touch on the surface thereof outside the command input region according to the touch position detection data output in response to the touch given to the outside of the command input region of the surface of the touch panel in the above-described embodiment, the present invention is by no means limited thereto and any of various command nullifying sections such as a hardware command nullifying circuit that is adapted such that, when the touch panel is touched on the surface thereof in the inside of the command input region while it is held in touch outside the command input region in a talk mode, it nullifies any input of command due to a touch in the inside of the command input region that is given while the touch panel is held in touch on the surface thereof outside the command input region according to the touch position detection data output in response to the touch given to the outside of the command input region of the surface of the touch panel may alternatively be used for the purpose of the present invention.

While the control section 30 of the information communication terminal 10 described above by referring to FIGS. 3 through 23 is applied to operate as position detecting section for detecting a touch position on the surface of the touch panel according to the touch position detection data that is supplied from the touch panel in response to a touch given to the surface in the above-described embodiment, the present invention is by no means limited thereto and any of various position detecting sections such as a hardware position detecting section that is adapted to detect a touch position on the surface of the touch panel according to the touch position detection data supplied from the touch panel in response to a tough given to the surface may alternatively be used for the purpose of the present invention.

While the control section 30 of the information communication terminal 10 described above by referring to FIGS. 3 through 23 is applied to operate as a command determining section adapted to determine if a touch position is in the inside of the command input region or not by referring to the command input region on the surface of the touch panel facing the display element being displayed on the display screen of the display section and the touch position detected by the position detecting section and, if it determines that the touch position is in the inside of the command input region, it then determines that the command represented by the display element facing the command input region that includes the touch position as the command input by the touch in the inside of the command input region on the surface of the touch panel in the above-described embodiment, the present invention is by no means limited thereto and any of various command determining sections such as a hardware command determining circuit that is adapted such that it determines if a touch position is in the inside of the command input region or not by referring to the command input region on the surface of the touch panel facing the display element being displayed on the display screen of the display section and the touch position detected by the position detecting section and, if it determines that the touch position is in the inside of the command input region, it then determines that the command represented by the display element facing the command input region that includes the touch position as the command input by the touch in the inside of the command input region on the surface of the touch panel may alternatively be used for the purpose of the present invention.

While the control section 30 of the information communication terminal 10 described above by referring to FIGS. 3 through 23 is applied to operate as a process executing section for executing a process that corresponds to the command determined by the command determining section in the above-described embodiment, the present invention is by no means limited thereto and any of various process executing sections such as a hardware process executing circuit for executing a process that corresponds to the command determined by the command determining section may alternatively be used for the purpose of the present invention.

While the connector jack 27 of the information communication terminal 10 described above by referring to FIGS. 3 through 23 is applied to operate as a connection section to which a headset having a sound input/output feature can be connected in the above-described embodiment, the present invention is by no means limited thereto and any of various connection sections such as USB connector to which a headset having a sound input/output feature can be connected may alternatively be used for the purpose of the present invention.

While the connector jack 27 of the information communication terminal 10 described above by referring to FIGS. 3 through 23 is applied to operate as a connection detecting section for detecting the presence or absence of a headset connected to the connection section in the above-described embodiment, the present invention is by no means limited thereto and any of various connection detecting sections such as a hardware connection detection circuit for detecting the presence or absence of a headset connected to the connection section may alternatively be used for the purpose of the present invention.

The present invention can broadly find applications in the field of information communication terminals adapted to prevent operation errors by controlling the inputs given through a touch panel in a talk mode for communicating with another apparatus for a talk and communication apparatus such as portable telephones and PDAs.

It should be understood by those skilled in the art that various modifications, combinations, sub-combinations and alterations may occur depending on design requirements and other factors insofar as they are within the scope of the appended claims or the equivalents thereof.

What is claimed is:

1. A communication apparatus for communicating with another apparatus, comprising:
    a touch panel having part of a surface thereof configured to be used as command input region for inputting a command, the command input region of the surface configured to be touched in the inside to input a command, the touch panel outputting touch position detection data being sent out in response to at least two touches given respectively to two spots on the surface for locating at least the two touch positions;
    a command nullifying section that nullifies the command input by a touch given to the inside of the command input region while the outside of the command input region of the surface of the touch panel is being touched based on the touch position detection data output in response to a touch given to the outside of the command input region of the surface of the touch panel when the inside of the command input region is touched while the outside of the command input region of the surface of the touch panel is being touched, in a talk mode;
    a display section that displays a display element on a display screen thereof, the display element representing the command that can be input in response to the touch given to the touch panel on the surface thereof in the inside of the command input region, in a talk mode; wherein
    the touch panel having the command input region as a region arranged on the display screen of the display section so as to face the display element being displayed on the display screen of the display section in a talk mode;
    a position detecting section that detects the touch position on the surface based on the touch position detection data supplied from the touch panel in response to the touch given to the surface; and
    a command determining section that determines whether the touch position is inside of the command input region or not based on the position of the command input region of the surface of the touch panel facing the display element being displayed on the display screen of the display section and the touch position as detected by the position detecting section and, in the case where the touch position is determined to be inside of the command input region, and determines the command represented by the display element facing the command input region including the touch position as the command input by the touch given to the inside of the command input region of the surface of the touch panel, wherein
    the command nullifying section is configured to control the command determining section in a talk mode in such a way that, in the case where the surface of the touch panel is touched sequentially at least at two spots and the command determining section determines that the touch position of the spot touched first is out of the command input region, the command determining section compulsorily determines that the touch position of the other spot touched second is also out of the command input region.

2. The apparatus according to claim 1, wherein
    the command nullifying section is configured to control the display section in a talk mode in such a way that, in the case where the command determining section determines that the touch position of a touch given to the surface of the touch panel is out of the command input region, the display section erases the display element on the display screen.

3. The apparatus according to claim 1, wherein
    the command nullifying section is configured to control the display section in a talk mode in such a way that, in the case where the command determining section determines that the touch position of a touch given to the surface of the touch panel is out of the command input region, the display section displays the display element on the display screen with lower luminance and/or lightness than normal.

4. The apparatus for communicating with another apparatus, comprising:
    a touch panel having part of a surface thereof configured to be used as command input region for inputting a command, the command input region of the surface configured to be touched in the inside to input a command, the touch panel outputting touch position detection data being sent out in response to at least two touches given respectively to two spots on the surface for locating at least the two touch positions;
    a command nullifying section that nullifies the command input by a touch given to the inside of the command input region while the outside of the command input region of the surface of the touch panel is being touched based on the touch position detection data output in response to a touch given to the outside of the command input region of the surface of the touch panel when the inside of the command input region is touched while the outside of the command input region of the surface of the touch panel is being touched, in a talk mode;
    a connection section connectable to a headset having a sound input/output feature; and
    a connection detecting section that detects the presence or absence of connection of the headset to the connection section, wherein
    the command nullifying section is configured to operate in such a way that when the connection of the headset to the connection section is detected by the connection detecting section in a talk mode and the touch panel is additionally touched on the surface thereof in the inside of the command input region while it is held in touch outside the command input region, it stops the operation of the touch panel instead of nullifying the input of the command input in response to the touch given to the command input region of the surface.

* * * * *